(12) United States Patent
Chiussi et al.

(10) Patent No.: US 11,082,481 B2
(45) Date of Patent: *Aug. 3, 2021

(54) APPARATUS FOR SINGLE WORKFLOW FOR MULTI-PLATFORM MOBILE APPLICATION CREATION AND DELIVERY

(71) Applicant: GADGET SOFTWARE, INC., Newark, NJ (US)

(72) Inventors: Fabio M. Chiussi, Long Branch, NJ (US); Parameshwar Hegde, Westford, MA (US)

(73) Assignee: GADGET SOFTWARE, INC., Hackensack, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,925

(22) Filed: Apr. 30, 2019

(65) Prior Publication Data
US 2020/0092351 A1 Mar. 19, 2020

Related U.S. Application Data

(63) Continuation of application No. 13/833,589, filed on Mar. 15, 2013, now Pat. No. 10,326,825.

(51) Int. Cl.
*H04W 4/50* (2018.01)
*H04W 4/60* (2018.01)
(Continued)

(52) U.S. Cl.
CPC ............... *H04L 67/10* (2013.01); *G06F 8/65* (2013.01); *H04L 67/16* (2013.01); *H04L 67/34* (2013.01);
(Continued)

(58) Field of Classification Search
CPC ..... H04L 67/10; H04L 67/1095; H04L 67/16; H04L 67/34; H04W 4/50; H04W 4/60
(Continued)

(56) References Cited

U.S. PATENT DOCUMENTS 6,542,908 B1 4/2003 Ims
6,804,718 B1 10/2004 Pang et al.
(Continued)

OTHER PUBLICATIONS

First Examination Report issued by the Patent Office of India in corresponding Indian Application No. 3457/KOLNP/2015 dated May 26, 2020.
(Continued)

*Primary Examiner* — Tonia L Dollinger
*Assistant Examiner* — Jonathan A Sparks
(74) *Attorney, Agent, or Firm* — Miles & Stockbridge P.C.; David R. Schaffer

(57) ABSTRACT

A System Solution of a Computing device and Computer hardware automatically generates a Data Model with a well-defined structure containing the Business Entity Data and a Service Representation with Services selected by a Business Entity. The System Solution applies the Data Model to an Automatic Application Generator that automatically generates an Application comprising a set of Native Application Clients for all desired platforms (mobile, non-mobile and Cloud), Application Servers, communication protocols, Dashboards, and other components. The output of the Automatic Application Generator provides a set of Application Clients for the particular platforms selected by the Business Entity and interacts with the Operating System of a Client Device. A Dashboard automatically generates Updated Applications based on the selected Services as desired by the Business Entity. The clients and servers communicate via an automatically generated Client-Server Protocol. The System Solution offers the ownership, control and beneficial use of this idea.

20 Claims, 33 Drawing Sheets

(51) Int. Cl.
  *G06F 8/65* (2018.01)
  *H04L 29/08* (2006.01)
(52) U.S. Cl.
  CPC .............. *H04W 4/50* (2018.02); *H04W 4/60* (2018.02); *H04L 67/1095* (2013.01)
(58) Field of Classification Search
  USPC ....................................................... 709/223
  See application file for complete search history.

(56) References Cited

U.S. PATENT DOCUMENTS

| | | | |
|---|---|---|---|
| 7,461,086 B1 | 12/2008 | Hurren et al. | |
| 7,596,620 B1* | 9/2009 | Colton ...................... | G06F 8/10 709/201 |
| 7,676,552 B2 | 3/2010 | Eilam et al. | |
| 7,822,983 B2 | 10/2010 | Aull et al. | |
| 7,984,060 B2 | 7/2011 | Payton et al. | |
| 8,170,536 B2 | 5/2012 | Normark et al. | |
| 8,407,610 B2* | 3/2013 | Gilboa ...................... | G06F 8/20 715/762 |
| 9,430,207 B1* | 8/2016 | Bandhole ................. | H04W 4/50 |
| 9,959,103 B2 | 5/2018 | Van Velzen et al. | |
| 10,051,444 B2 | 8/2018 | Chiussi et al. | |
| 10,320,885 B2 | 6/2019 | Chiussi et al. | |
| 10,320,942 B2 | 6/2019 | Chiussi et al. | |
| 10,728,717 B2 | 7/2020 | Chiussi et al. | |
| 2002/0033843 A1 | 3/2002 | Loos et al. | |
| 2002/0078253 A1 | 6/2002 | Szondy et al. | |
| 2003/0028579 A1 | 2/2003 | Kulkarni et al. | |
| 2003/0208640 A1 | 11/2003 | Just | |
| 2004/0064348 A1* | 4/2004 | Humenansky ....... | G06Q 10/063 705/7.11 |
| 2006/0026335 A1 | 2/2006 | Hodgson et al. | |
| 2006/0236254 A1* | 10/2006 | Mateescu ................. | G06F 8/75 715/762 |
| 2006/0236302 A1 | 10/2006 | Bateman et al. | |
| 2007/0150816 A1 | 6/2007 | Hariki | |
| 2007/0157191 A1 | 7/2007 | Seeger et al. | |
| 2009/0006409 A1 | 1/2009 | Yang et al. | |
| 2009/0063421 A1 | 3/2009 | Burson et al. | |
| 2009/0183092 A1 | 7/2009 | Naghshineh | |
| 2010/0005481 A1 | 1/2010 | Lewis et al. | |
| 2010/0070496 A1 | 3/2010 | Ghosh | |
| 2010/0124939 A1 | 5/2010 | Osborne et al. | |
| 2011/0004564 A1* | 1/2011 | Rolia ................... | G06Q 10/067 705/348 |
| 2011/0016448 A1 | 1/2011 | Bauder et al. | |
| 2011/0137935 A1 | 6/2011 | Bobick et al. | |
| 2011/0154287 A1 | 6/2011 | Mukkamala et al. | |
| 2011/0161912 A1 | 6/2011 | Eteminan et al. | |
| 2011/0164056 A1 | 7/2011 | Ording et al. | |
| 2011/0276608 A1 | 11/2011 | O'Farrell et al. | |
| 2012/0094643 A1 | 4/2012 | Brisebois et al. | |
| 2012/0109951 A1 | 5/2012 | Huynh et al. | |
| 2012/0174079 A1 | 7/2012 | Luh | |
| 2012/0213103 A1 | 8/2012 | Cheng-Wei et al. | |
| 2012/0226676 A1 | 9/2012 | Kasterstein et al. | |
| 2012/0260232 A1 | 10/2012 | Hirsch et al. | |
| 2012/0278704 A1 | 11/2012 | Ying et al. | |
| 2012/0322470 A1 | 12/2012 | Said et al. | |
| 2012/0323965 A1 | 12/2012 | Carpenter et al. | |
| 2013/0013671 A1 | 1/2013 | Relan et al. | |
| 2013/0145348 A1* | 6/2013 | Agovic ..................... | G06F 8/34 717/120 |
| 2013/0219376 A1* | 8/2013 | Nelson ................ | G06F 9/44505 717/138 |
| 2014/0033011 A1 | 1/2014 | Wandeler et al. | |
| 2014/0068549 A1* | 3/2014 | Friedman .................. | G06F 8/30 717/104 |
| 2014/0089339 A1 | 3/2014 | Siddiqui et al. | |
| 2014/0245262 A1 | 8/2014 | Hill et al. | |
| 2014/0280475 A1 | 9/2014 | Chiussi et al. | |
| 2015/0304389 A1 | 10/2015 | Chiussi et al. | |
| 2020/0007615 A1 | 1/2020 | Brebner | |

OTHER PUBLICATIONS

First Examination Report issued by the Patent Office of India in corresponding Indian Application No. 3455/KOLNP/2015 dated Jun. 9, 2020.
ISR written opinion of the International searching authority for the corresponding PCT application 2014026981.
Non-Final Office Action dated Oct. 1, 2020 in corresponding U.S. Appl. No. 16/916,702.
Non-Final Office Action dated Oct. 15, 2020 in corresponding U.S. Appl. No. 16/398,929.
Notice of Allowance dated Oct. 23, 2020 in corresponding U.S. Appl. No. 16/398,932.
Final Office Action dated Mar. 9, 2021 in corresponding U.S. Appl. No. 16/398,929.

* cited by examiner

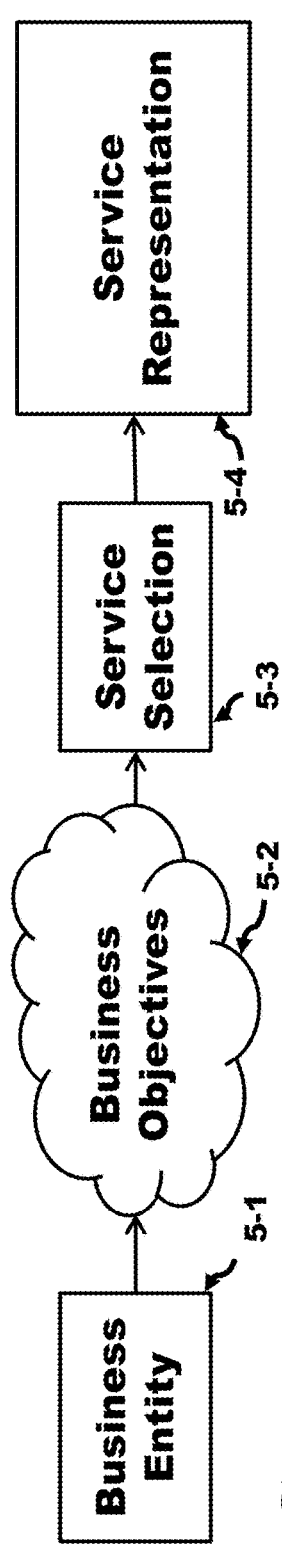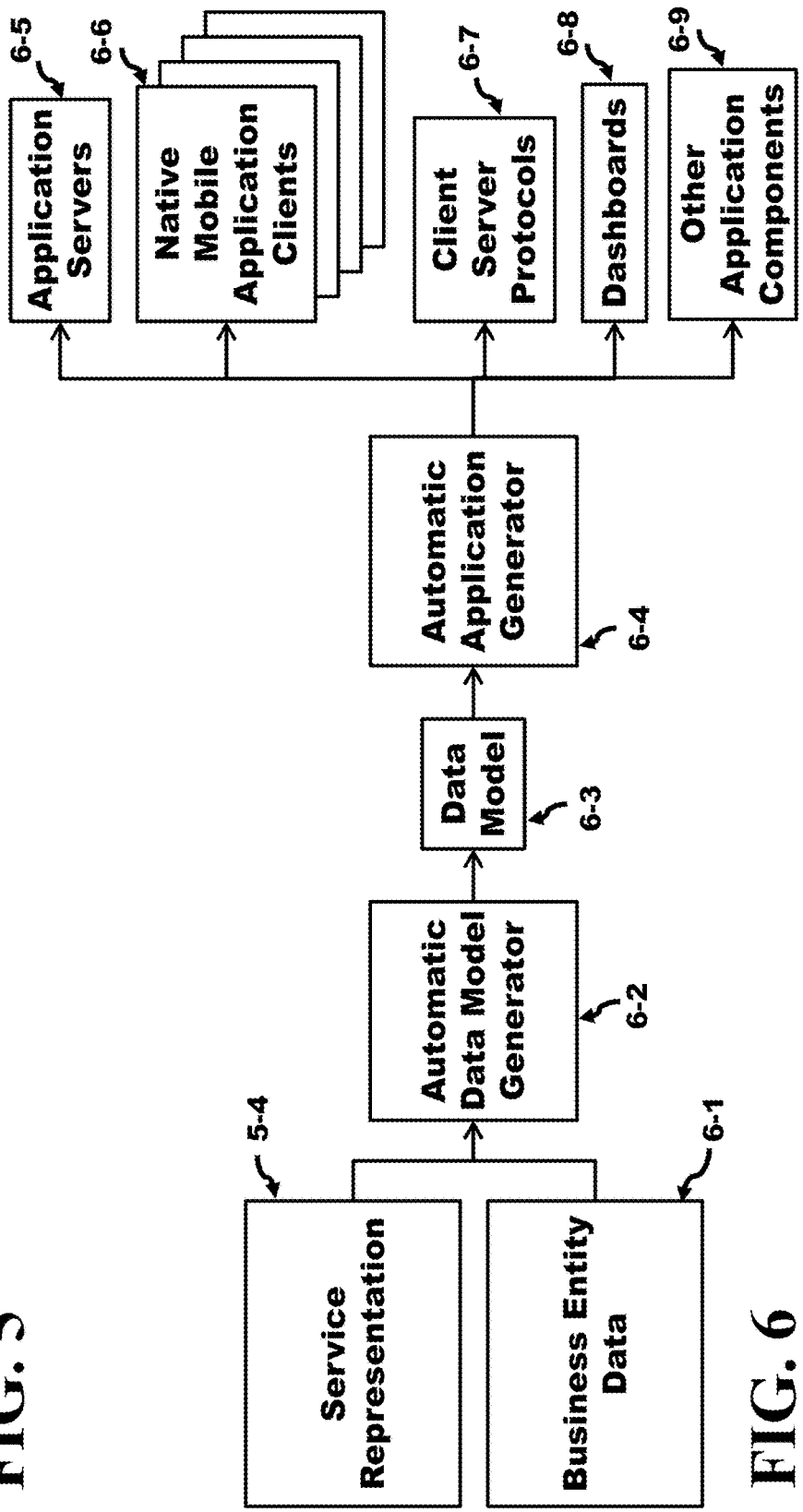

| Service Family → 11-2 | 11-3 → Service Examples | | | |
|---|---|---|---|---|
| Greeting Services | In-Location Greetings | Automatic Check-Ins | | |
| Personalized Experience Services | Personalized Promotions | In-Store-Only Experiences | Real Time Experiences - Yield Mgmt. | Personalized Storefront | Context/Location Specific Experiences |
| Information Services | Personalized Information Discovery | Customized Information | Intelligent Notifications/ Reminders/Alerts | Personalized Contextual Guides | Intelligent Navigation |
| 2nd Screen Services | Contextual Product Information | Contextual Interactivity | Contextual Virtual Walls | | |
| Correlation Services | Interest ⇔ Product Correlation | Contextual Correlation | Real Time Correlation | Information-Based Correlation | Social-Based Recommendation |
| Value Services | Intelligent Shopping Lists/Wallets | Product Trackers | Store Navigators | Personal Organizer Calendar/Concierge | Reservations |
| Convenience Services | Mobile Ordering | Mobile Deli Counter | Activity Trackers | | |
| Loyalty Services | Personalized Loyalty | Purchase-Based Rewards | Activity-Based Rewards | VIP Services | |
| Communication Services | Contextual Feedback | Contextual Polls | Personalized Messaging | One-Click Communications | Reviews |
| Utility Services | Mobile Payments | Price Finder | Social Sharing | Store Finders | |

| Description | Examples |
|---|---|
| • Provides a description of the Service "as a Black Box". <br> • This is a very high-level description (i.e., in plain English) of how the Service behaves from the point of view of an end user. It is typically a list of bullet points that describes the behavior of all aspects of the Service. <br> • The end user is both the Consumer who uses the Mobile Application and the Business Entity who provides and manages the Service and may receive data and analytics back from the usage of the Service by the Consumer. <br> • The purpose of the "Black Box" Description is to give a high-level idea to the Business Entity of what the Service will provide to the Consumer and how the Service will be managed by the Business Entity. <br> • The "Black Box" Description is not an actual input to the Automatic Data Model Generation Process. It is simply provided to make the selection process by the Business Entity easier and clearer. | Real Time Promotion Service <br> • A Promotion is created via a Dashboard. The promotion includes a product description, an offer, and an expiration date/time. <br> • The Promotion is distributed in real time to the Mobile Application Clients in the vicinity of a desired store (i.e., within a certain radius from the store). <br> • The Mobile Application Clients that receive the Promotion display a Notification alerting the Consumer that the Promotion is available. <br> • The Consumer can redeem the Promotion and receive the discount. <br> • Once the expiration date/time is reached, the Promotion is not displayed in the Application Client and cannot be used. <br><br> Real Time Promotion Personalized to Shopping List Service <br> • This is an example of Service Chaining: Real Time Promotion Service plus Personalization Service plus Shopping list Service. <br> • The Promotion behaves the same as described above. <br> • When the Promotion is created, keywords can be added via a Dashboard. The keywords are used to match the Promotion with items in the Shopping list. <br> • The Shopping List Service is a list of items that the Consumer can enter through their Application Client. <br> • The Promotion is distributed in real time only to the Mobile Application Clients in the vicinity of a desired store which have in their shopping List keywords that match the items. <br><br> Electronic Loyalty Service - "Key Chain" Card <br> • An electronic Loyalty Card is associated to each Consumer. <br> • The electronic Loyalty Card is displayed in the Mobile Application Client and has a barcode that can be scanned at the Point of Sale (PoS) to identify the Consumer. <br> • Points based on Consumer purchase are added to the Loyalty Card from the PoS. <br> • Consumer redeems rewards when a pre-defined number of points is accumulated. <br> • Consumer can check the balance or points on his/her card at any time from the Application Client. |

FIG. 15A     Service "Black Box" Description ← 14-1

| Description | Examples |
|---|---|
| • A Service may have a number of variations or flavors, which accommodate different use cases.<br>• The Business Entity selects which flavor(s) it wants.<br>• The flavor(s) may not be mutually exclusive.<br>• The Service Flavors consist of a high level description of what the Service looks like.<br>• If needed for clarity to the Business Entity, there can be a Black Box Description for each flavor.<br>• The selected flavor(s) is an input to the Automatic Data Model Generation Process, since it determines the defining features of the Service. | Electronic Loyalty Service<br>• *Electronic Loyalty Key Chain Card Service.* This is the electronic equivalent of a physical loyalty card carrying a bar code (e.g., the supermarket membership cards that people carry around in their key chain). It displays a barcode, which is scanned at the PoS at the store, and identifies the Consumer.<br>• *Electronic loyalty Punch Card Service.* This is the electronic equivalent of a physical loyalty punch card (e.g., a "buy 10 sandwiches get 1 free" card that gets punched by the cashier every time the Consumer buys a sandwich. In this case, the Business may display a QR code at the PoS at the store, Tthe mobile Application Client scans the QR code, which identifies the Purchase and "punches" the electronic card.<br>Promotion Service<br>• *Real Time Promotion Service.* These promotions can be created, distributed, and retired in real time (e.g., a "20% off for the next two hours" Promotion).<br>• *Location Specific Promotion Service.* These promotions are valid only at a specific, configurable store within a chain of stores. |

Service Flavors 14-2

FIG. 15B

| Description | Examples |
|---|---|
| • Specifies the available relevant features of a Service.<br>• The list of relevant features depends on the Service. Some features depend on the Service Flavor.<br>• This looks like a menu of features, and the Business Entity selects the features that it needs.<br>• Some features may be defined as "default" features and provided in the Application without the need for the Business Entity to explicitly select them.<br>• Some features when selected automatically select other required features, which are necessary for the feature to work properly.<br>• Some features when selected automatically require certain Integration Points to be defined in order for the Service to work as expected.<br>• The Service Features are a key input of the Automatic Data Model Generation Process. | Promotion Service<br>*Type of Promotions: e.g.*<br>• straight: dollar discount (e.g., $5 off).<br>• Percentage (e.g., 10% off).<br>• Buy X get Y free (e.g., buy one get one free).<br>*Redemption Mechanisms available: e.g.:*<br>• Via bar code (e.g., the application displays a bar code that identifies the promotion and can be scanned at the PoS to redeem it). This mechanism typically requires en Integration Point with the PoS system, since the bar code has to be known by the PoS system in order to property account for the promotion.<br>• Via QR code (e.g., the application displays a QR code that identifies the promotion and can be scanned at the PoS to redeem it.).<br>• Via "redeem button" (e.g., the application displays a "redeem button" that the Consumer can tap when at the PoS to receive the discount).<br>• Via short code (e.g., the application displays a short code that the Consumer can give to the Cashier in order to receive the discount).<br>*Redemption Scope: e.g.:*<br>• In-store only (e.g., the promotion)<br>• In-store plus home delivery. |

Service Features  14-3

FIG. 15C

| Examples |
|---|
| Electronic loyalty Service<br>*Loyalty Events:* e.g.,<br>• Purchase-Based Loyalty Points. Consumer gets loyalty points associated to certain purchases (e.g., one point per dollar spent at the store).<br>• Non-purchase-Based Loyalty Points. Consumer gets Loyalty points for actions other than purchase (e.g., enter the store more than once a month.<br>*Reward Threshold:* e.g.,<br>• Single threshold. Consumer gets a reward when he/she accumulates a number of loyalty points equal to the Reward Threshold.<br>• Multiple threshold. Consumers gets different rewards *when* he/she accumulates points equal to one of a number of available Reward Thresholds.<br>*Loyalty levels*<br>• Single loyalty level.<br>• Multiple loyalty levels (e.g., Silver and Gold loyalty levels, each Consumer is associated with one level depending on the frequency he/she visits a store: Sliver level gets one loyalty point per dollar spent, Gold level gets two loyalty points per dollar spent). |

Service Features (cont.)   14-3

FIG. 15D

| Description | Examples |
|---|---|
| • Specifies relevant values of parameters that need to be specified by the Business Entity for the Service to be configured.<br>• The configuration parameters typically depend on the selected Service Features. Each selected Service Feature may require one or more Configuration Parameter.<br>• Some of the Configuration Parameter Values are required before the Application can be deployed (e.g., Store Locations for Location-Specific Promotions).<br>• Some of the Configuration Parameter Values are entered once the Application is deployed, or are entered when the Data Model is dynamically updated (e.g., a new Promotion is created and distributed in a Promotion Service).<br>• The Configuration Parameter Values are entered either via Dashboards (e.g., all the data required to set up a new Promotion, or via Integration Points (e.g., a file with all the Store Locations is read by the Automatic Data Model Generation Process).<br>• Some Services may have Configuration Parameter Values that are entered by the Consumer via the Application Client when the Service is run.<br>• The Automatic Data Model Generation Process validates that all the Configuration Parameter Values that are needed to run the Service have been entered. | Promotion Service<br>• *Store locations:* e.g., name of store, address, GPS coordinates, size of the store.<br>• Bar codes identifying the Promotions.<br>• *Redemption Rules:* e.g., a specific Promotion is only valid before 6:00pm on weekdays, a Promotion can only be redeemed once.<br>• *Promotion Data:* e.g., product description, offer value, expiration date, product picture.<br><br>Electronic Loyalty Service<br>• *Loyalty values:* e.g., one loyalty point per dollar spent.<br>• *Reward threshold values.*<br>• Reward items associated to each Reward thresholds.<br>• *Reward rules:* e.g., loyalty points expire after one year. |

Service Configuration  14-4

FIG. 15E

| Description | Examples |
|---|---|
| • Specifies the functionality of the User Interface with the Consumer End User. | Promotion Service user Interface:-e.g.<br>• Displays Promotion Data in multiple levels of detail (e.g., view showing Promotion summary, view showing Promotion details).<br>• Allows grouping promotions in categories and provides multiple level of navigation: e.g., selection of category, selection of promotion within category.<br>• Displays bar Code that identifies the promotion. |

Service User Interface

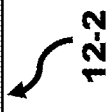

| Description | Examples |
|---|---|
| • The Dashboards are the interfaces that get automatically generated for the Business Entity to manage the Service and dynamically update it. This describes the functionality provided in the Dashboards.<br>• The functionality of the Dashboard strictly depends on the selected Service Features and is directly derived from the portion of the Service that is dynamically changeable. | Promotion Service Dashboard: e.g.,<br>• Allows to create and distribute a Promotion.<br>• Allows to enter: name of Promotion, Promotion code, product description, offer value, start date/time, expiration date/time, keywords. |

Dashboards

| Description | Examples |
|---|---|
| • A Service may be using Integration Points with other systems and databases belonging to the Business Entity or to other entities.<br>• Integration Points are used to get Business Data input (or provide data output) or to get other type of Data (e.g., content) that may be needed to run the Service.<br>• Integration Points are implemented by generating interfaces specified as a list of inputs, outputs and parameters that are passed through the interface. | Promotion Service Integration Points: e.g.<br>• PoS Integration: Exchange Promotion Codes for each Promotion and receive Purchase Data for each consumer.<br>• External Database Integration to ingest store locations. |

Service Integration Points

| Description | Examples |
|---|---|
| • A Service may be using other Services, accessible via Internal Service Interfaces.<br>• The Internal Service Interfaces are specified as a list of inputs, outputs and parameters that are passed through the interface.<br>• The Internal Service Interfaces typically do NOT need to be made visible to the Business. | Promotion Service using Bar Coding and Redemption Services<br>• Bar Coding Service Interface; input: unique number identifying an item; output: barcoding image with barcoding label.<br>• Redemption Service Interface: input: Promotion_ID and Consumer_ID; output valid or invalid redemption. |

Service Internal Interfaces

| Description |
|---|
| The Business Entity can specify one of two Service Status: Active and Dormant.<br>Active is a Service that is actively running, deployed, and exposed to the Consuming Entity (typically the Consumer) via the User Interface.<br>Dormant is a Service that is disabled, but all the Application Clients for that Service are generated. This includes functionality, interfaces, and presentation.<br>The Status of the Service is set by the Business and can be changed at any time.<br>Using the Dormant Status, the Business Entity can create the Service and keep it disabled but ready for future use. |
| Service Status |

APPARATUS FOR SINGLE WORKFLOW FOR MULTI-PLATFORM MOBILE APPLICATION CREATION AND DELIVERY

PRIORITY APPLICATION

This application is a continuation of U.S. patent application Ser. No. 13/833,589, filed on Mar. 15, 2013, which has been incorporated herein by reference in its entirety.

CROSS-REFERENCE TO RELATED APPLICATIONS

The present application is related to the co-filed U.S. application Ser. No. 13/833,669 entitled "Method for Single Workflow for Multi-Platform Mobile Application Creation and Delivery", Ser. No. 13/833,775 entitled "Dynamic User Interface Delivery System", Ser. No. 13/833,849 entitled "User Interface and Content Translation System" and Ser. No. 13/834,765 entitled "Hierarchical Application Client System", filed on Mar. 15, 2013, which are assigned to the same assignee as the present application and invented by the same inventors as the present application and incorporated herein by reference in its entirety.

BACKGROUND OF THE INVENTION

The internet is a communication system that interconnects the world. The internet has been structured to provide connectivity to billions of users with laptops, notebooks, desktops, TV set, cellular phones, smartphones like the iPhone™, Android™ and Blackberry™, and tablets. The internet 1-3 connects a client device 1-2 to a server 1-4 and the server to the same client device as illustrated in 1-1 of FIG. 1A or to another client (not illustrated). The client 1-2 can have at least one display screen 1-8 that can be a touch sensitive screen, pen based or both. The screen can display various icons or be attached to a physical keypad 1-9. As illustrated in 1-1 some of the Client Devices can be mobile units such as cellular phones and smartphones, tablets, laptops, desktops and Internet-enabled TV sets. The Client Devices are physical and can be either mobile (cellular phones, smartphones, wearable devices, and tablets) or non-mobile (laptops, desktops, and TV sets), and coupled to the internet by wired (a physical interconnect), wirelessly (waves through space), or both wired/wireless networks. The wireless connectivity can be cellular (3G, 4G, etc.), Wi-Fi, Bluetooth, WiMax, etc. The Client Device 1-2 has the Application Client which is the actual application software running on device.

The Cloud uses the network of the internet to offer services to users by using a combination of hardware and software embedded in the network. For example, Adobe™ and Microsoft™ offer the ability of using their software programs via the Cloud, while other companies offer storage capabilities via the Cloud to their customers. An Application Client can be in the Cloud, but in this case the Client Device is a "virtual" Client Device. The "virtual" Client Device has a way to provide access to the Application Client running in the cloud via a physical Client Device. For example, as in the example listed in 1-5 of FIG. 1B, a web browser 1-6 running on the physical Client Device 1-2 and coupled to the client/server 1-7 in the Cloud via the Internet accesses the Application Client running in the Cloud, which performs the actual application software. For the Cloud, there are two cases: the entire Application Client runs in the Cloud, or a small portion of the Application Client runs on a physical Client Device while most of the logic runs in the Cloud.

FIG. 2A illustrates a system 2-1 with the hardware 2-16 and software 2-15 of a Client Device 1-2. The Client Device 1-2 is coupled to the internet 1-3 via wireline connection or Radio Frequency (RF) wireless transmission network (wired/wireless) 2-2 and further coupled to a bank of servers 2-4 via a second interconnection 2-3 that can be wired or wireless. The communication link is a receiver and a transmitter known as a transceiver and is coupled to either a wired connector or an antenna (not illustrated) for the wireline connection or RF wireless transmission network, respectively. In general, these links: wired, wireless, cellular, internet, etc. are called the Communication network. The Communication network couples all components together. The server's bank 2-4 comprises server-0 2-11 to server-N 2-12. The bank contains at least one server and these servers can be localized, coupled by an Intranet, or be physically separated from one another, coupled by the Internet. The operating system (OS) 2-13 is closely coupled with the hardware 2-16, especially in case of Mobile Client Devices 1-2. The hardware 2-16 comprises a processor 2-5 operating under the operating system 2-13. The processor 2-5 is coupled to the memory 2-7 and communication link 2-9 via the bus 2-8. The communication link 2-9 couples the Client Device to the outside world through a wired and/or wireless interconnection via the transceiver. One mode of input to the Client Device 1-2 is via the touch based keypad 2-6 or through voice control (not illustrated). Other hardware components such as memory, power supplies, etc. are not mentioned but as well-known by those skilled in the art. The screen 2-10 can provide an output response or sound can provide a second mode of output known as voice output (not illustrated). The screen 2-10 can be a touch sensitive screen and provide a second mode of input. A set of applications or Application Clients 2-14 are coupled to the operating system 2-13. The Client Device is one of a plurality of Client Devices coupled to the Internet.

FIG. 2B illustrates that when the term server 2-20 is used, this server is a sub-set representation of a Computer hardware 2-17, which can contain software 2-18, a database 2-19 and the server 2-20 itself. Other components not illustrated are the memory, power supply, etc. One skilled in the art would know the other components contained in this device and will not be described further. All servers used in this specification are substantially the same as the server 2-20. Furthermore, a plurality of Servers and a plurality of Databases can be embedded in the Computer hardware 2-17.

The term "Application Client" refers to the portion of the application running on the Client Device. Although "Mobile Application" is synonymous with "Application Client," the term "Application Client" encompasses the Application Client running on a mobile device, a non-mobile device or even in the Cloud. The Cloud can run a portion of the Application Client in the server while the remaining portion of the Application Client can run on the client, simultaneously. In this regard, the server becomes a client/server system within the network.

An approval process in the Application Store is illustrated in FIG. 3. A client 1-2 desires a particular application 3-1. The application 3-1 is submitted 3-2 to the Application Store for an approval process 3-3. If accepted 3-4, information is passed to the Application Store 3-5 to allow the application (APP) to be downloaded 3-6 into the client 1-2. The client now contains a "native" application coupled to the operating system 2-13 (see FIG. 2A) of the Client Device which was provided by the Application Store 3-5. The Native Mobile Application Client executable depends on the operating system (OS) as an iPhone would require a different executable than an Android™ phone.

FIG. 4 presents two different layered stacks of the hardware/software representation for a Client Device. The iPhone, Android or Blackberry phone stack 4-2, for example, consists of hardware 2-16, Operating System (OS) 2-13 and the Native Application Client 4-5. The Native Application Client is currently unalterable. Once the application is downloaded and if the user of the Client Device 1-2 desires a feature change in the Native Application Client, the user must go back to the application store (see 3-5 in FIG. 3) and download an updated version of the application that has this change implemented. This can take a significant amount of time to get the new Native Application Client since the updated application needs to be developed, re-submitted to the application store, and re-approved by the application store. The application store expends funds to re-approve the new executable and the approval process may take considerable time. Once accepted, the store must distribute the new Native Application Client to the Client Device. The second layered stack 4-3 comprises a non-Native Application Client 4-1 which has an executable based on a programming language that is understood by a web browser running on the Client Device. The most common example of such a language is HTML5. The application client written in HTML5 does not depend on the OS 2-13 but instead runs on the browser 4-4 of the Client Device 1-2. The browser 4-4 may depend on the Client Device 1-2, but the non-Native Application Client 4-1 does not depend on the Client Device 1-2.

BRIEF SUMMARY OF THE INVENTION

The term "Application Client" encompasses the Application Client running on a mobile device, a non-mobile device or even in the Cloud. However, in some cases, within this document the term "Mobile Application Client" will be used for both Native and non-Native Application Clients running on Mobile Devices, but it also applies to Devices that are Non-Mobile or in the Cloud. In addition, the term "Client Device" encompasses the device being Mobile, Non-Mobile or located in the Cloud. However, in some cases, for further distinction within this document the term "Mobile Client Device" will be used for mobile devices, "Non-Mobile Client Device" will be used for non-mobile devices and "Cloud Client Device" will be used for the device formed in the Cloud. Finally, the System Solution offers the ownership, control and beneficial use of these inventive ideas.

A preferred embodiment of the invention is the apparatus and connections of the System Solution. The computing device and a dedicated server comprising Computer hardware 2-17 using Software 2-18, Server 2-20 and a Data Base 2-19 form the System Solution. The Computing hardware may be located next to the computing device or via an Internet coupled to a dedicated bank of Computer hardware. The Computing device and Computer hardware offers Service Representation software and at least one mode of input to input Business Entity Data to automatically generate Service data and place it into a Data Base. The Data Base has a well-defined structure. Then, the Computing device and Computer hardware use the Data Base to automatically generate the Application from the Services that were selected in the Service Representation by the Business Entity. The automatically generated Application comprises a plurality of Application Components, including Application Servers, Native and Non-Native Mobile Application Clients, Non-Mobile and Cloud Application Clients, Client/Server Protocols, management components, and other components. The computing device and Computer hardware offer the ownership, control and beneficial use of this inventive idea. The System Solution offers any Business Entity the ability of automatically generating their own Applications based on selected service parameters. These Applications provide executables for Mobile, Non-Mobile and Cloud Client Devices. These Application Clients can then be downloaded onto the Client devices for the Customers use.

In accordance with one preferred embodiment of the invention, a Business Entity such as a retailer, a manufacturer, a school, a museum, a franchise, or an individual desires an application capable of running on a Mobile or Non Mobile Device, or in the Cloud. As a further distinction, the Business Entity desires that the Mobile Application Client be at least one of a Native Mobile Application Client and a Non-Native Mobile Application Client. Native Application Client is defined as Application Clients that are provided to the user by downloading the Application Client from an application store such as Apple, Android, or Blackberry and run directly on the Operating System of the Client Device, and thus can take full advantage of the capabilities of the Client Device. Since the executable of a Native Application Client runs directly on the Operating System of the Client Device, a dedicated executable of a Native Application Client needs to be generated for each Operating System that the Business Entity desires the Application to run on. The plurality of Native Application Clients for all the Client Devices constitutes the set of Native Application Clients generated by the System Solution. A Non-Native Application Client runs on a web browser that in turn runs on the Client Device. A Non-Native Application Client is written in a language that is understood by the web browser running on the Client Device, an example of such a language being HTML5. The Non-Native Application Client does not depend on the Operating System of the Client Device. However, the web browser on which the Non-Native Application Client runs on may depend on the Client Device.

In this preferred embodiment of the invention, the Business Entity is provided with a Service Representation representing the high level representation of the functionality to be implemented in the application and at least one mode of input for the Business Entity to enter Business Entity Data describing aspects of the Business Entity that are relevant to configure the desired functionality of the application. The Service Representation and the Business Entity Data are used by the System Solution to automatically generate a Data Model. The Data Model is then applied by the System Solution to an Automatic Application Generator that automatically generates all the required Application Components to implement the Application. The output of the Automatic Application Generator comprises executables of Native Application Clients and Non-Native Application Clients for all platforms selected by the Business Entity (mobile, non-mobile and Cloud).

Another preferred embodiment of the invention includes the apparatus comprising Computing devices with dedicated servers running the System Solution that, based on the Services selected by the Business Entity in the Service Representation and on the entered Business Entity Data, runs an Automatic Data Model Generator. This Automatic data Model Generator places the widely varying and random data positioning from any Business Entity into a well-defined Data Model which acts as an interface between the Automatic Data Model Generator and the Automatic Application Generator. The random data positioning of the Service Representation selected by the Business Entity and the Business Entity Data on one side of the Data Model is translated into a well-defined memory structure on the other side of the Data Model. This is the first part of the innovative embodiment. The second part of the innovative embodiment allows the Automatic Application Generator to extract the data from the Data Model which is now well structured and in known memory positions. The Automatic Application Generator uses the data according to the Service Representation desired by the Business Entity to generate the desired Application. This generated Application comprises a plurality of Application Component, including Application servers, Native Mobile Application clients, Non Native Mobile Application Client, Client server protocol, dashboards and other components. All these Application Components implement the desired functionality of the Application for the Business Entity.

A further preferred embodiment of the invention is an apparatus that provides the generated Dashboards to the Business Entity. Using the generated Dashboard and Business Entity Data, the Business Entity automatically generates an Updated Data Model. The Updated Data Model is then used by the System Solution to automatically generate an Updated Application. Such an Updated Application consists of a plurality of Updated Application Components including a set of Updated Native Mobile Clients, Non-Native Mobile Clients, Non-Mobile and Cloud Mobile Clients, and other components. The newly generated Updated Application Components replace the corresponding existing Application Components. In some cases, these Updated Application Components do not need an approval from the Application Store and can be directly downloaded to Client Devices.

In accordance with another preferred embodiment of the invention, a System Apparatus comprising a System Solution with at least one Computing device, a plurality of Client Devices where each Client Device is running an Operating System, the System Solution with at least one first server automatically generates Application Components from a Data Model, a Communication network that couples the plurality of Client Devices, a plurality of Computer hardware, the at least one first server and the at least one Computing device together to deploy the Application Components, a first part of the Application Components deployed to the plurality of Computer hardware to create a first plurality of Application Servers retaining the first part of the Application Components, a second part of the Application Components deployed to the at least one first server, and a corresponding portion of the second part of the Application Components couples to a corresponding Client Device in the plurality of Client Devices via the Communication network. The System Apparatus further comprising a plurality of Validation Controllers to show a validity and a consistency of each of the Application Components. The System Apparatus further comprising a Service Representation and a Business Entity Data automatically generate the Data model. The System Apparatus wherein the first part of the Application Components comprises a Retailer Application Server and a Retailer Application Server Database, a Consumer Application Server and a Consumer Application Server Database created by an Automatic Application Server Generator coupled to a Server Data Model. The System Apparatus wherein the first part of the Application Components comprises a Client Server Protocol and Security created by an Automatic Protocol Generator coupled to a Common Data Model. The System Apparatus wherein the first part of the Application Components comprises Dashboards created by an Automatic Dashboards Generator coupled to a Common Data Model. The System Apparatus wherein the second part of the Application Components comprises an Analytics, a Native Mobile Application Client, a Non-Native Mobile Application Client, a Non-Mobile Application Client and a Cloud Application Client created by an Automatic Client Generator coupled to a Client Data Model. The System Apparatus wherein the first part of the Application Components comprises a Searchable Application Representation created by an Automatic Searchable Application Representation Generator coupled to a Common Data Model. The System Apparatus wherein the Data Model comprises a Common Data Model, a Server Data Model and a Client Data Model, and outputs of the Data Model are partitioned between a Common Data Model output, a Server Data Model output and a Client Data Model output, wherein the Data Model comprises a Functional description, Configuration Parameters, Integration Point Parameters and Presentation Attributes. The System Apparatus wherein the Client Device is a mobile device, a wearable device, a non-mobile device, or a Cloud device coupled to the Communication network. The System Apparatus further comprising a first Client Device with a first Operating System is downloaded with at least one Native Mobile Application, and a second Client Device with a second Operating System is downloaded with at least one Non-Native Mobile Application, wherein the second part of the Application Components comprises the at least one Native Mobile Application and the at least one Non-Native Mobile Application.

In accordance with another preferred embodiment of the invention, an apparatus comprising a System Solution with at least one first server coupled to at least one Computing device, a Service Representation generated using the System Solution and an Automatic Data Model Generator automatically generates a Data Model using the Service Representation, a Business Entity Data and the System Solution. The apparatus further comprising a plurality of Validation Controllers to show a validity and a consistency of the Data Model. The apparatus wherein the Service Representation comprises a high-level feature list includes a Service Black Box Description, Service Flavors, Service Features, a Service Configuration, Service User Interfaces, Dashboards, Service Integration Points, Service Internal Interfaces, Service Presentation and a Service Status. The apparatus wherein the Data Model comprises a Common Data Model, a Server Data Model and a Client Data Model, and outputs of the Data Model are partitioned between a Common Data Model output, a Server Data Model output and a Client Data Model output, wherein the apparatus of the Data Model comprises a Functional Description, Configuration Parameters, Integration Point Parameters and Presentation Attributes.

In accordance with another preferred embodiment of the invention, a System Apparatus comprising a System Solution with at least one first server coupled to at least one Computing device, a Business Entity Data of a Business Entity loaded on a server, fillable entries of Dashboards filled by the Business Entity, the Dashboards controlled by the System Solution generates an Updated Data Model and the Updated Data Model and an Automatic Application Update Generator automatically generates a set of Updated Applications Clients. The System Apparatus further comprising a plurality of Validation Controllers show a validity and a consistency of the Updated Data Model, and the plurality of Validation Controllers show the validity and the consistency of the set of Updated Applications Clients. The System Apparatus further comprising the set of Updated Applications Clients includes an Updated Native Mobile Application Client, an Updated Non-Native Mobile Application Client, an Updated Non-Mobile Application Client and the System Apparatus further comprising an Updated Cloud Application Client and further comprising each the Updated Applications Clients are downloaded to a corresponding Client Device via a Communication network.

BRIEF DESCRIPTION OF THE DRAWINGS

Please note that the drawings shown in this specification may not necessarily be drawn to scale and the relative dimensions of various elements in the diagrams are depicted schematically. The inventions presented here can be embodied in many different forms and should not be construed as limited to the embodiments set forth herein. Rather, these embodiments are provided so that this disclosure will be thorough and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 5 shows a Business Entity desiring to create a Service Representation in accordance with the present invention.

FIG. 6 illustrates the flow chart of a Business Entity creating a desired Application Client automatically in accordance with the present invention.

FIG. 11 depicts a chart offering service families and corresponding service examples in accordance with the present invention.

FIG. 15A-K depicts a Description and Examples of the block structure of the Service Representation for different Services in accordance with the present invention.

DETAILED DESCRIPTION OF THE INVENTION

Figure 1B:
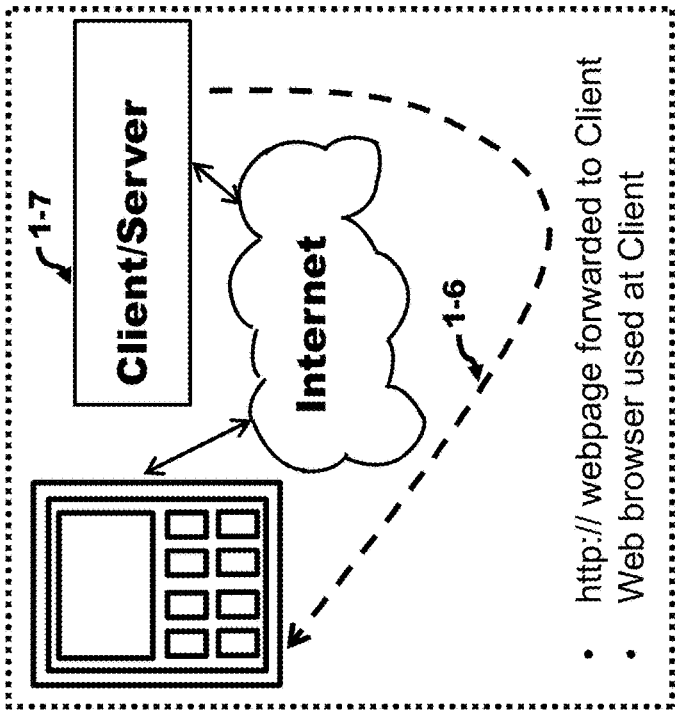
FIG. 1B depicts a Client Device coupled to a client/server.
Figure 1A:
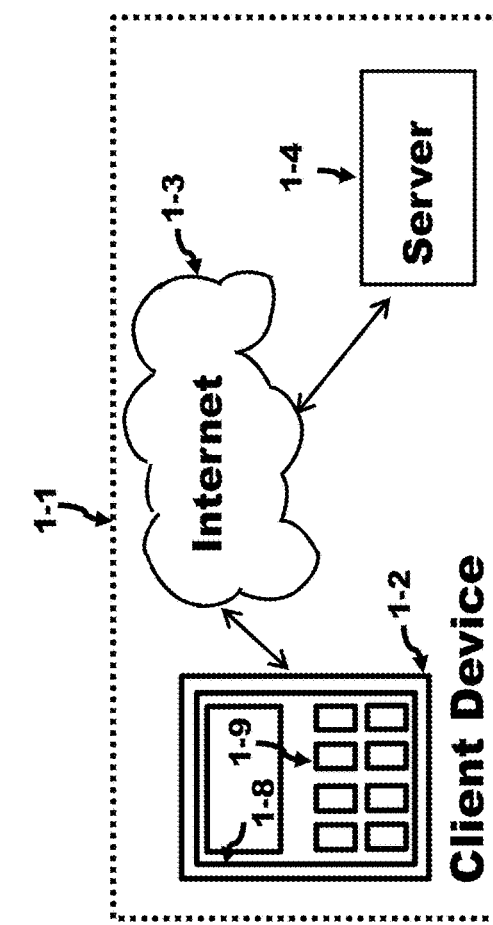
FIG. 1A depicts a Client Device coupled to a server and provides some examples of Client Devices.

The System Solution offers the ownership, control and beneficial use of this inventive idea. The System solution offers the beneficial use to the Business entity by providing Applications for the Business Entity. The Applications provided by the System Solution comprise a plurality of Application Components, and include Application Clients that run on Mobile, Non-Mobile, and Cloud Client Devices. The System Solution is the owner of all Application Components automatically generated by the System Solution. The System Solution creates and hosts Applications for different Business Entities (each Business Entity is a System Solution customer). The term Retailer is used loosely as a synonym for Business Entity. The System Solution Consumer Application Server supports the services presented to the users by the Mobile Application Clients, Non-Mobile Application Clients, and Cloud Clients, while the System Solution Retailer Application Server is used by the Business Entity to monitor and manage the Application, including all the Application Clients. The System Solution provides a complete environment for the creation, hosting, updating, and management of the Application. All Application Servers generated by the System Solution (specifically, the System Solution Consumer Application Server and System Solution Retailer Application Server) for all Business Entities are hosted in a multi-tenant environment in the Cloud, but each Business Entity "feels" like it is provided dedicated Retailer and Consumer Application Servers. The System Solution architecture also applies with minor changes to a scenario where the System Solution Consumer Application Server and System Solution Retailer Application Server run on dedicated servers owned by the Business Entity, rather than in the Cloud. In this scenario, the System Solution has access to control and offer beneficial use for those servers that are coupled to the Cloud.

Business Entities deploy their Applications to reach Consumers (i.e., the customers of that Business Entity served by System Solution). The Consumers are the primary End Users of the Application Clients generated by the System Solution. The Business Entities are the End Users of the Dashboards and the Retailer Portal that the System Solution provides to each Business Entity for managing the corresponding Application.

Each Application is described as a collection of Services. A Service is a set of functionality that is provided by a Service Providing Entity to a Service Consuming Entity. The Service Consuming Entity uses the Service to accomplish a certain task or function or activity. Conceptually, this definition of "Service" is analogous to the notion of Service that Consumers obtain from a Service Provider, for example, a cellphone service or a health care service. The Service Providing Entity is the Provider or Originator, while the Service Consuming Entity is the End User or Target. There is a type of interface between the Service and the Service Providing Entity and between the Service and the Service Consuming Entity. The nature of such interfaces depends on the Service Providing/Consuming Entity, and could be a User Interface, an Application Programming Interface, or some other type of interface.

For a given Service, the interface between the Service Providing Entity and the Service is referred to as the Southbound Interface, while the interface between the Service Consuming Entity and the Service is referred to as the Northbound Interface. Services can also have a Management Interface through which they can be configured at runtime by a Service Configuration Entity.

Mobile Client Devices (cellular phones, smartphones, wearable devices, and tablets) and Non-Mobile Client Devices (laptops, desktops, and Internet-enabled TV sets) are coupled to the internet by wired (a physical interconnect), wirelessly (waves through space), or both wired/wireless networks. The wireless connectivity can be cellular (3G, 4G, etc.), Wi-Fi, Bluetooth, WiMax, etc. The network interconnecting these components is called the Communication network. The Client Device 1-2 has the Application Client which is the actual application software running on device. The cellular phones, smartphones, wearable devices, tablets, laptops, desktops, and Internet-enabled TV sets are Client Devices and are physical devices that can be held. The term "Mobile" when used alone or in a larger phrase "Mobile Client Devices" can also imply the terms Mobile, Non-Mobile or in the Cloud. The term Mobile Client at times will be referred to as the Client Device. The term Application highlights the fact that the application built by the System Solution comprises a plurality of Application Components, and includes a portion of the Application that runs on the Client Device (the Application Client) and a portion of the application that runs on a server (the Application Server). The Application Client can be a part of the OS of the mobile or non-mobile Client Device or can be partially in the Cloud. In the case of a mobile physical Client Device, such a Client Device is placed in the hands of an End User. In the case of a non-mobile physical Client Device, such a Client Device is placed in the proximity of the End User. In all cases, the Client Devices provide the End User with at least one mode of input through which the End User navigates and interacts with the Application Client.

Each Application includes a family of Application Clients. Each Application Client corresponds to a certain Client Device. The family of Application Clients includes a set of Native Mobile Clients, one per mobile platform. Some examples of the mobile platforms include the iPhone, iPad, Android phones, or tablets while the non-mobile systems include the desktops. Mobile platforms of interest include tablets. For convenience, we use the term Mobile Application Client (or more succinctly Mobile Client) to refer to any Mobile Client in the family of Mobile Clients corresponding to an Application generated by the System Solution.

FIG. 5 illustrates how a Business Entity 5-1 generates the Service Representation (high level representation) 5-4. The Business Entity 5-1 is the entity that wants to create the application. The Business Entity is a customer of the System Solution. Examples of Business Entities are: retailers, manufacturers, schools, museums, franchises, and individuals. The Business Entity 5-1 determines the Business Objectives 5-2 which are used to create the Service Selection 5-3. The Business Entity 5-1 selects the services in the Service Selection 5-3 which is used to determine the Service Representation 5-4. The Service Representation is a high-level description of the functionality that the Business Entity wants to be implemented in the application. The Service Representation 5-4 defines which Services are included in the Application according to the interest of the Business Entity. The Service Representation uniquely defines the desired functionality and contains sufficient information for the System Solution to automatically generate a Data Model corresponding to the Application. The Service Representation 5-4 includes a set of Service Specifications, which specify the desired Service Features, Service Configuration, Service Interfaces, and Service Presentation that are implemented in the Application.

A simplified version of the Automatic Application Generator is illustrated in FIG. 6. The Service Representation 5-4 and the Business Entity Data 6-1 are entered into in Automatic Data Model Generator 6-2. The Automatic Data Model Generator 6-2 analyzes the information from the Business Entity Data and the Service Representation and segments the information automatically into memory into pre-arranged slots. The output of the Automatic Data Model Generator 6-2 with a well formatted memory structure is used to create the Data Model 6-3. The structure of the Data Model 6-3 is uniform between any and all different Business Entities and the Services they select. The uniformity in the structure of the Data Model 6-3 can now be capitalized. The data outputs of the Data Model 6-3 present data to the inputs of the Automatic Application Generator 6-4 in a well-organized structure. The Automatic Application Generator 6-4 can now focus on the automatic generation of features since all data has been partitioned into a known structure. The Automatic Application Generator 6-4 knows the structure of the Data Model 6-3 allowing the output of the Automatic Application Generator 6-4 to automatically create a plurality of Application Components. These features include the Application Servers 6-5, a set of Native Mobile Application Clients 6-6, a Client/Server Protocol 6-7, Dashboards 6-8 that has entries which are fillable and Other Application Components 6-9.

After the Application Components have been generated by the System Solution, they are deployed by installing and making them available for use. The Application Servers 6-5 are installed on servers coupled to the Internet. The Native Mobile Application Clients 6-6 are submitted for approval to the corresponding Application Stores, such as, Android, Apple, blackberry, etc. Once the Mobile Application Clients are approved by the Application Stores, they become available for download by consumers to their Client Devices 1-2. The Dashboards 6-8 are installed on a plurality of servers coupled to the Internet. Other Application Clients 6-9 are made available for download by storing them on servers coupled to the Internet.

Native Mobile Application Clients 6-6 offer a family of executables of native Mobile Clients for all desired mobile platforms. This enables a self-service Automatic Application Creation environment for native Mobile Applications Clients.

A very intuitive, high level Service Representation 5-4, such as a visual or graphical Service Representation 5-4 can be used to initiate a fully Automatic Application Creation flow that generates a plurality of Application Components, including a family of Native Mobile Application Clients 6-6. The Client/Server Protocol 6-7 is a communication mechanism between the Application Client and the Application Server. Application Server control, Mobile Application Client memory management, and Client/Server communication mechanism 6-7 are used to optimize Mobile Application Client response time and bandwidth utilization. There are Dashboards 6-8 that are automatically created and provided to the Business Entities to manage the Services implemented in the Application and to generate a new set of updated Application Clients. The Dashboards are controllers and the Business Entity may use the Dashboards via a web interface running in a web browser or via a mobile interface. Such a mobile interface may simply consist of a mobile version of a web interface, or be integrated in a "management version" of the Mobile Application Client itself, or grouped in a separate tablet or smartphone application.

Figure 7A:
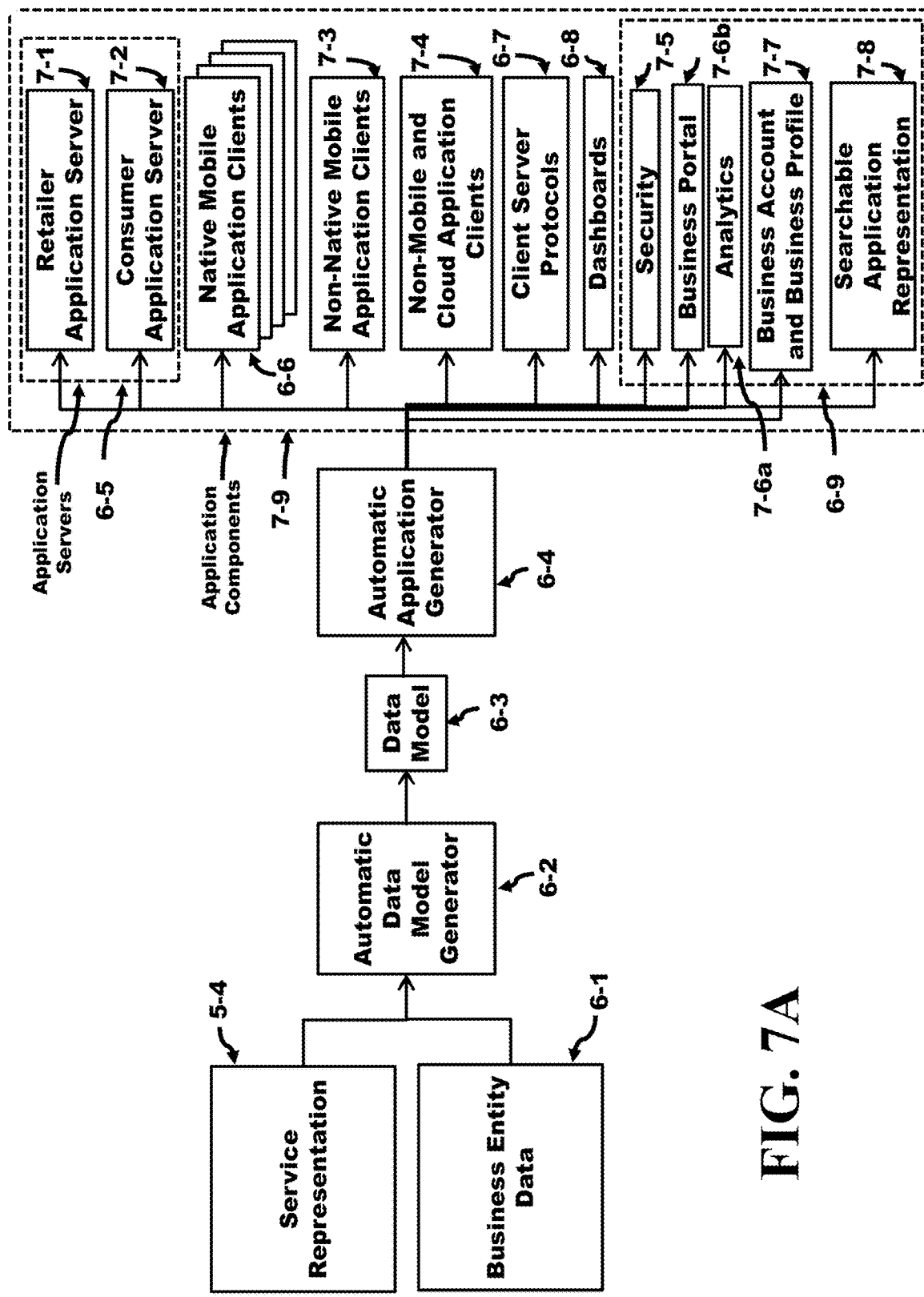
FIG. 7A depicts a more detailed list of client applications created in FIG. 6 in accordance with the present invention.

FIG. 7A illustrates a more detailed description of the automatic application creation which runs software on a server to generate all the Application Components in detail. The Service Representation 5-4 and the Business Entity Data 6-1 are used by the Automatic Data Model Generator 6-2 to create the Data Model 6-3. The Business Entity Data 6-1 contains specific data pertaining to the Business Entity that is relevant to run the Services implemented in the Application. Examples of Business Entity Data 6-1 are inventory, locations of stores, price of goods, etc. The output of the Data Model 6-3 is applied to the Automatic Application Generator 6-4 which creates all the Application Components 7-9 in detail partially described in FIG. 6. These components are deployed by a Communication network and include the Application Servers 6-5 comprising the Retailer Application Server 7-1 and the Consumer Application Server 7-2, a set of Native Mobile Application Clients 6-6, a Non-Native Mobile Application Clients 7-3, a Non-Mobile and Cloud Application Clients 7-4, Client/Server Protocols 6-7 and Dashboards 6-8. There is one Native Mobile Application Client 6-6 per Native Mobile OS (iOS for iPhone, Android, Blackberry, Windows, etc.). The Other Application Components 6-9 are Security 7-5, Business portal 7-6b, Analytics 7-6a, Business Account and Business Profile 7-7 and Searchable Application Representation 7-8. A first part of the Application Components is deployed to a plurality of Computer hardware to create a first plurality of servers retaining the first part of the Application Components. A second part of the Application Components deployed to the at least one first server.

The Retailer Application Server 7-1 is used by the Business Entity 5-1 to monitor and manage the Application Components for their Business Entity. The Consumer Application Server 7-2 supports the Services implemented in the Application and presented to the consumers via all Mobile, Non-Mobile, and Cloud Clients. All Application Servers (specifically, the Consumer Application Server 7-2 and Retailer Application Server 7-1) for all Business Entities that are customers of the System Solution are hosted in a multi-tenant environment in the Cloud, but each Business Entity "feels" like it is provided a dedicated Retailer and Consumer Application Server. The architecture also applies with minor changes to a scenario where the Consumer Application Server 7-2 and Retailer Application Server 7-1 run on servers owned by the Business Entity, rather than in the Cloud. In this scenario, the working assumption is that the System Solution has access to those servers. Businesses deploy their Application to reach Consumers (i.e., the customers of that Business Entity). The primary End Users of the Application Clients are the Consumers of each Business Entity (i.e., the customers of all the Businesses served by the System Solution). The Business Entities are the End Users of the Dashboards and Retailer Portal that the System Solution generates and provides to each Business for managing the corresponding Application.

Security 7-5 provides security and privacy in all communications between Application Clients and Application Servers for each Business Entity. Security 7-5 also guarantees that there is no communication between Retailer Application Servers or Consumer Application Servers associated with different Business Entities and that Retailer Databases and Consumer Databases associated with different Business Entities are kept separate. The System Solution offers basic protection against Denial of Service (DoS) attacks for each System Solution Application.

The Analytics 7-6a consists of functionality to collect and process analytics data on consumer engagement and usage in the Application Clients and transmit that data to the Application Server, and functionality to store and process analytics the received analytics data in the Application Server.

The Business Portal 7-6b includes a number of interfaces for the Business Entity to view the processed Analytics Data and for the Business Entity to enter Business Data and manage its Business Profile. It also includes interfaces for the Business Entity 5-1 to access the Web and Mobile Dashboards 6-8 and other tools that the Business Entity uses to manage, monitor, and update the Services implemented in its Application. The Business Portal 7-6b also includes interfaces for the Business Entity 5-1 to manage its Searchable Application Representation 7-8. The Business Portal used by the Business Entity handles: sales, marketing, customer service and support, appointments, analytics, feedback, and other customer facing tasks.

The Business Account and Business Profile 7-7 comprises the Business Account and the Business Profile. The Business Account is used to store information in the System Solution Database regarding the Business Entity 5-1 as a customer of the System Solution, such as management, billing, and sales information. The Business Profile stores relevant Business Entity Data 6-1 and all the information relevant to run the Services provided by the Business Entity 5-1 and implemented in the Application.

Each Mobile Application is associated with a Searchable Application Representation 7-8, which makes the corresponding Mobile Application Client and the content contained in such Mobile Application Client searchable by search engines. SEO techniques can be used in the System Solution Searchable Application Representation to boost the search results of the corresponding Mobile Application Client and content. Searchable Application Representation 7-8 for each Business Entity 5-1 is generated by the System Solution when the Application for that Business Entity is created.

Figure 7B:
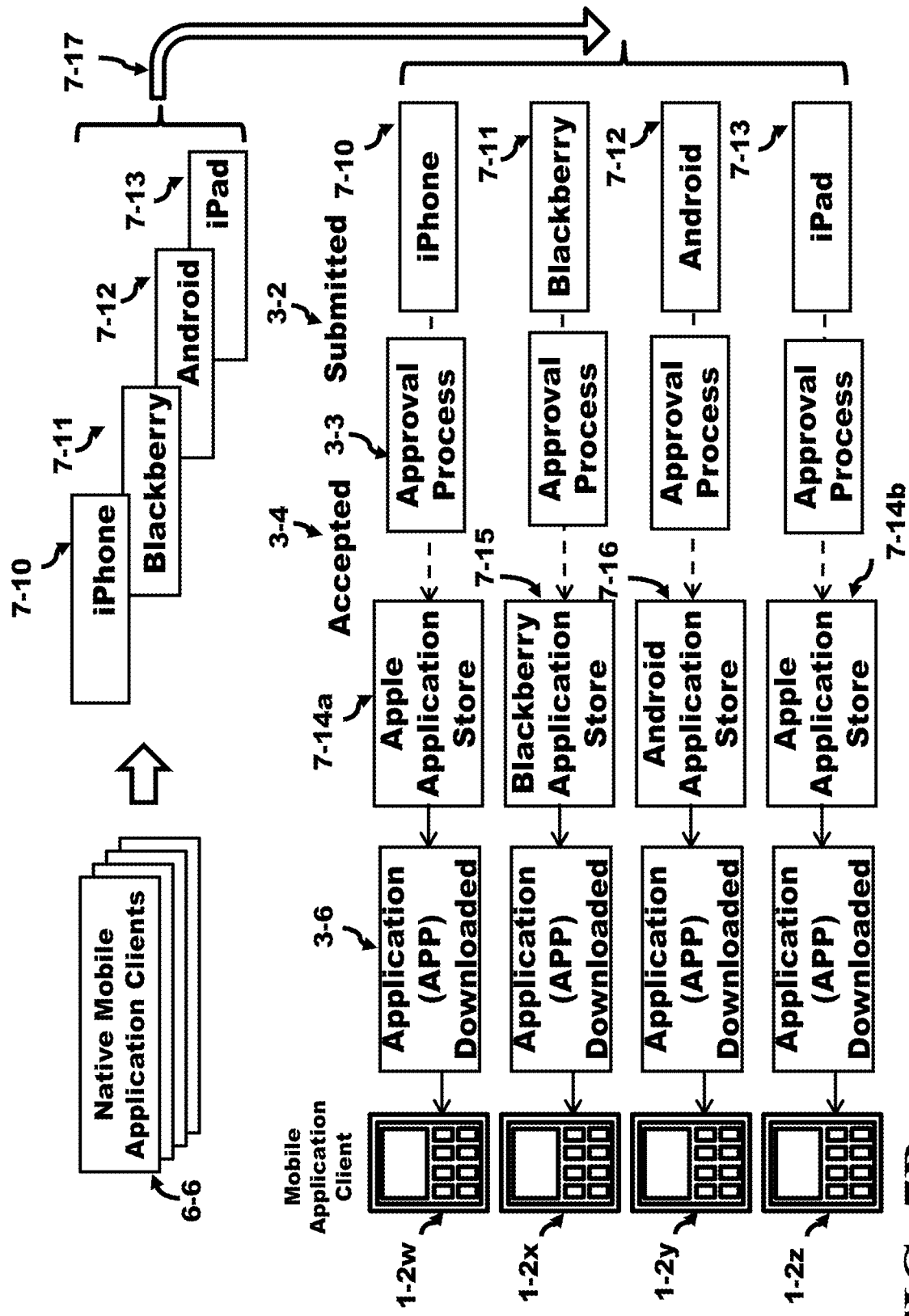
FIG. 7B shows how the automatically generated Native Mobile application Clients are provided to the Client via a store in accordance with the present invention.

FIG. 7B illustrates how the Native Mobil Application Clients 6-6 are downloaded to Mobile Application Clients (1-2w, 1-2x, 1-2y, and 1-2z). The set of Native Mobile Application Clients 6-6 contains, for example, an iPhone Application 7-10, a Blackberry Application 7-11, an Android Application 7-12 and an iPad Application 7-13. A plurality of other combinations of other Application Clients is possible. The arrow 7-17 shows these four Applications being applied to the corresponding Application store. These four Applications; an iPhone Application 7-10, a Blackberry Application 7-11, an Android Application 7-12, and an iPad Application 7-13 are submitted 3-2 to the approval process 3-3 to get accepted 3-4. The iPhone Application 7-10 and iPad Application 7-13 are each applied to the Apple Application Store 7-14a and 7-14b, the Blackberry Application 7-11 is applied to the Blackberry Application Store 7-15 and the Android Application 7-12 is applied to the Android Application Store 7-16. The Applications iPhone 7-10, Blackberry 7-11, Android 7-12 and iPad 7-13 are downloaded 3-6 to the corresponding Mobile application Clients 1-2w, 1-2x, 1-2y and 1-2z, respectively.

Figure 8:
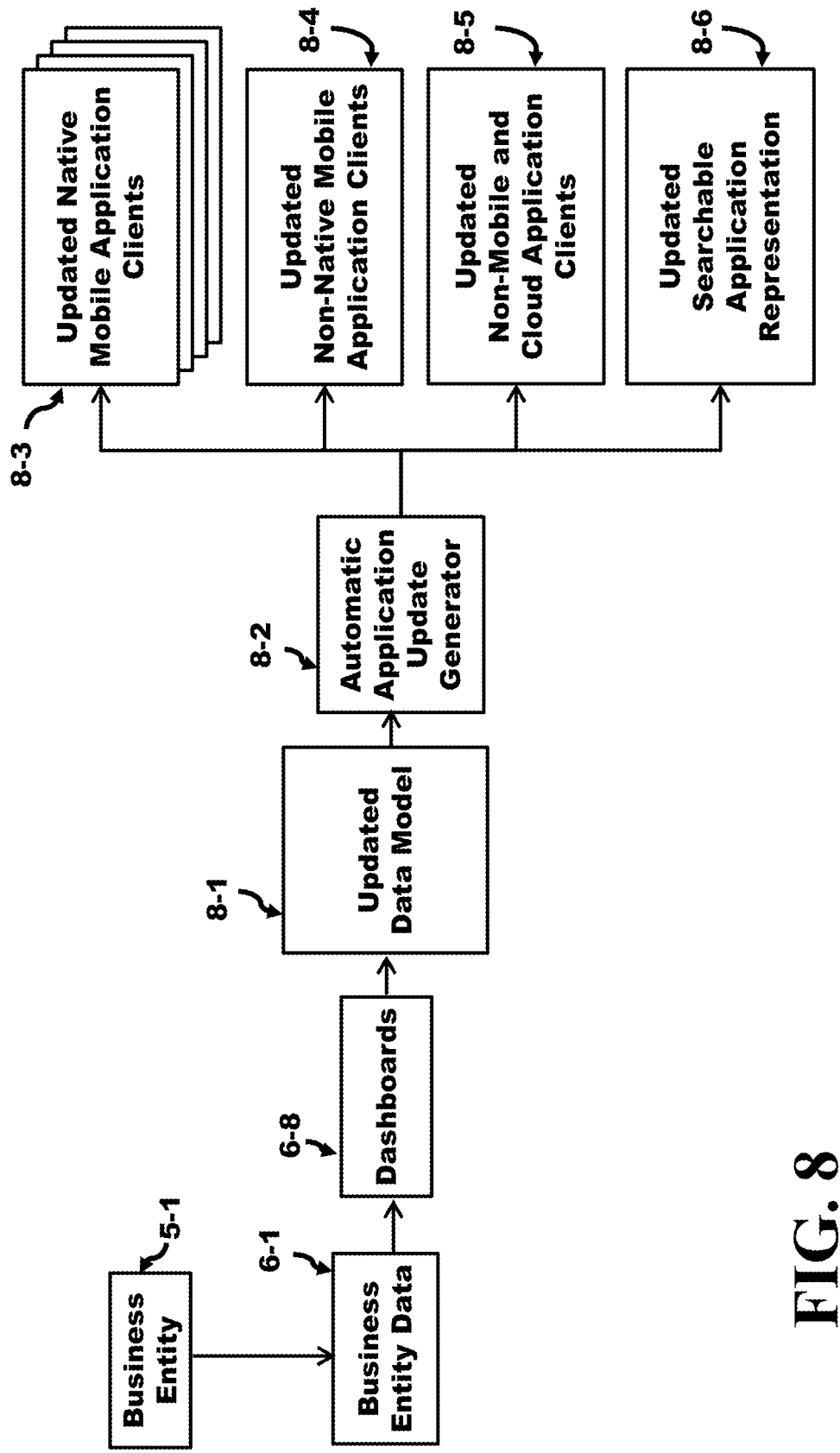
FIG. 8 presents the Dashboards used by the Business Entity to update the data model of the application to create updated applications in accordance with the present invention.

FIG. 8 presents an Application Update flow which shows how the newly created application can be further updated by the Business Entity 5-1 using the newly created Dashboards 6-8. The Dashboards 6-8 that are automatically created in FIG. 6 are used by the Business Entity 5-1 to add, delete, or modify content, features, and services contained in the Application and replace the existing set of Application Clients. The Dashboards 6-8 can be used by the Business Entity 5-1 to generate a new set of Native Mobile Application Clients containing the added, deleted, or modified content, features, and services. The System Solution allows the Business entity to modify the Data Model and generate new Application Clients using the Automatic Application Update 8-2 so that the Business Entity 5-1 can interact with their Customers through the Client Devices 1-2. The generated Dashboard 6-8 allows the Business Entity to have control of what the Business Entity wants to present to their Customers. The Business Entity 5-1 using the Dashboards 6-8 update and recreate the features of the Native Mobile Application Clients 6-6, Non-Native Mobile Application Clients 7-3, Non-Mobile and Cloud Application Clients 7-4 and the Searchable Application Representation 7-8 of FIG. 7 (all others remain the same) by providing input to the Business Entity Data 6-1 which provides data for the Dashboards 6-8. The output of the Dashboards 6-8 is applied to the Updated Data Model 8-1 which is then applied to the Automatic Application Update Generator 8-2 which is a sub-set of the Automatic Application Generator 6-4. The output of the Automatic Application Update Generator 8-2 generates a set of Updated Native Mobile Application Clients 8-3, an Updated Non-Native Mobile Application Client 8-4, an Updated Non-Mobile and Cloud Application Client 8-5 and a Updated Searchable Application Representation 8-6. Once this sequence has been established, the Business Entity can manipulate the business data applied to the Dashboards 6-8 and can continuously and automatically update the various Application Clients that this particular system generates.

The Retailer Portal 7-6b and Dashboards 6-8 provide the Business Entity 5-1 with a solution for the self-service monitoring, management, and updating of an Application consisting of a plurality of Application Components (i.e., after that Application is created), through a set of Dashboards 6-8 and tools that the Retailer can directly access (hence, the self-service nature of the process) this updating process. This is called the Application Retailer Management Flow.

Depending on the nature of the additions, deletions, and modifications and on the architecture of the generated Native Mobile Application Client, the newly generated Updated Native Mobile Application Clients 8-3 may have to be resubmitted for approval to the corresponding Application Stores in order for the new clients to be downloaded to the Client Devices 1-2. In certain cases, the newly generated Native Mobile Application Client do not require resubmission of the Mobile Client to the corresponding Application Store, and therefore do not require explicit updates from the Application Stores of those Application Clients running on the Client Devices. In such cases, the System Solution provides internal client/server update mechanisms that perform the updates in a "dynamic manner" that is "instantaneous" and completely transparent to the Consumer and Business Entities.

The Application Clients are dynamic in nature, and can be managed and updated to a certain extent via a corresponding set of Dashboards 6-8 accessed by the Business Entity through the Retailer Portal. Using the Dashboards 6-8, a Retailer can: Add, delete, and modify content within the application; Add, delete, and modify Pages within a Service in the application; Modify the navigation within the application; and turn on and off Services (i.e., make Services active or dormant) that were selected when the application was created.

Mobile and Non-Mobile Clients are capable to update their content and functionality "dynamically" and efficiently, under the control of the Consumer Application Server, so as to provide a very engaging experience to the Consumers. The Dynamic architecture is designed to support "dynamic" experiences in the most efficient and responsive way possible. The objective is to enhance the Client user experience in terms of response time while maintaining the dynamic nature of portions of the Client. The structure of the Dynamic Architecture allows identifying the Elements and Sub-Elements that are most likely to change. In this way, the Consumer Application Server 7-2 can send to the Mobile Client only incremental updates, with a "minimum" amount of information which maximizes the bandwidth usage of this interface. The Mobile Client and the Consumer Application Server 7-2 follow a simple Update Strategy to update the Pages and content in the Mobile Client 1-2. The Mobile Client 1-2 also follows a greedy Persistency Strategy, to keep in memory as much information as possible to be displayed while requesting for fresher copies of certain Elements and Sub-Elements.

Figure 9:
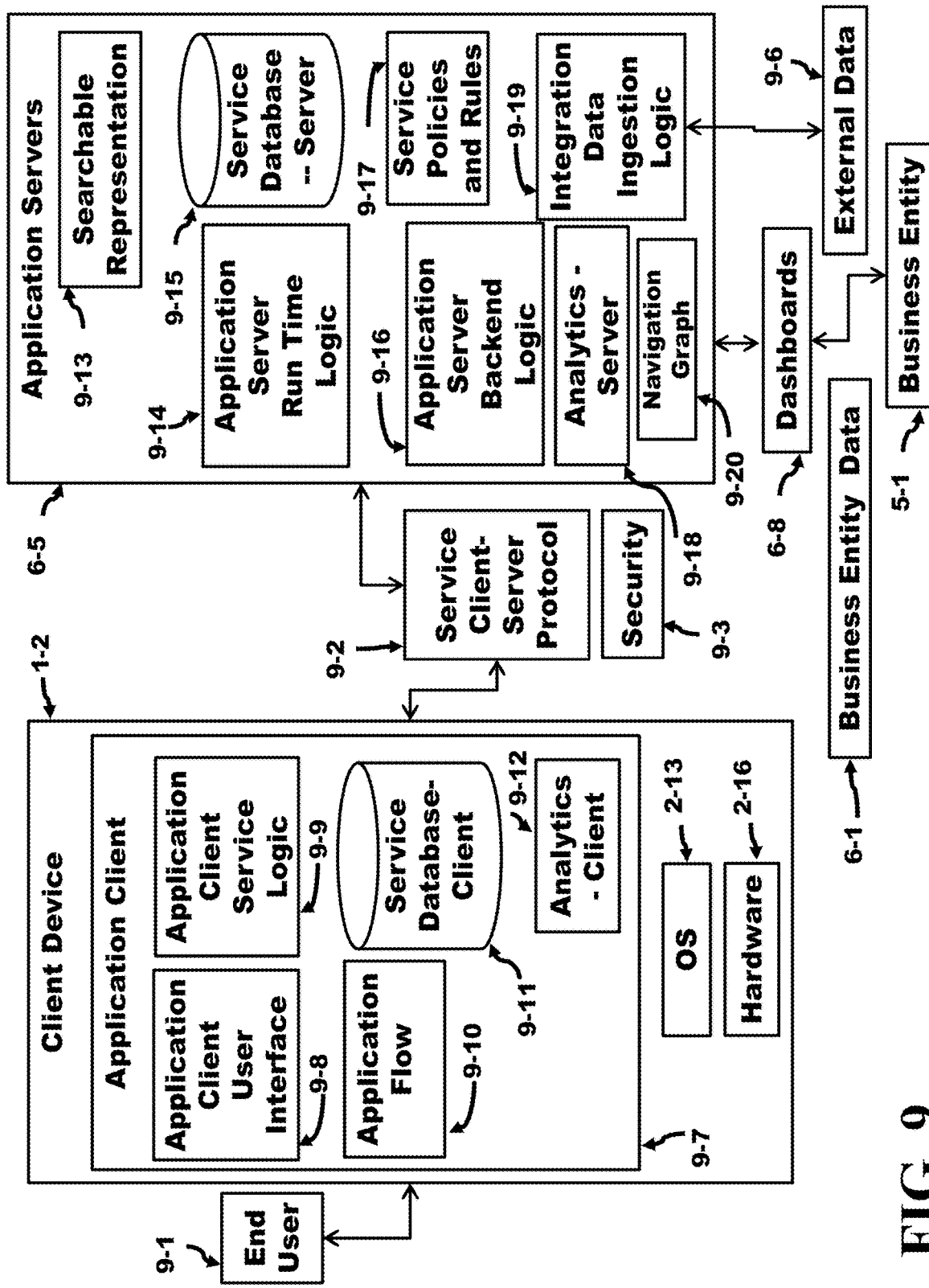
FIG. 9 shows the End User, Client Device client/server protocol and application servers for a Business Entity in accordance with the present invention.

FIG. 9 illustrates further details of the functional components that implement a Service and are automatically generated by the System Solution. The Service Representation 5-4 automatically generates the Service. The End User 9-1, or Customer, interfaces to the Client Device 1-2. The Service Client-Server Protocol 9-2 exchange information between the Application Servers 6-5 and the Client Device 1-2. The Business Entity 5-1 uses the Dashboards 6-8 which are a sub-set of the external data 9-6. If the Service does not change, the Dashboards are not used and the Data stays the same. Business Entity Data 6-1 is available from the Business Entity 5-1.

The Client Device 1-2 consists of the Application Client 9-7, an Operating System 2-13 and Hardware 2-16. The Application Client 9-7 further comprises several blocks. These blocks include the Application Client User Interface 9-8, the Application Client Server Logic 9-9, the Application Flow 9-10, a Service Database-Client 9-11 and an Analytics-Client 9-12. The Service Client-Server Protocol 9-2 is associated with Security 9-3 that is used to encode the information that is sent between the Client Device 1-2 and the Application Servers 6-5. The Application Servers 6-5 comprises the Searchable Representation 9-13, an Application Server Run Time Logic 9-14, a Service Database-Server 9-15, and an Application Server Backend Logic 9-16, Service Policy and Rules 9-17, Analytics-Server 9-18, Navigation Graph 9-20 and an Integration Data Ingestion Logic 9-19. The Application Server Run Time Logic 9-14 runs in the Consumer Application Server 7-2 and the Application Server Backend Logic 9-16 runs in the Retailer Application Server 7-1.

A Client portion (Mobile, Non-Mobile or in the Cloud) presents the Service to the End User 9-1, allowing Consumers to enter inputs, interact with the Services, and collect statistics. In turn, this includes a User Interface (UI), mobile application logic and a mobile data structure. For example, the (Client Device 1-2) can run on a Mobile phone. The mobile application logic and mobile data structure use a number of Client functional blocks or widgets to implement the required functionality. An Application Server portion, which runs in the Consumer Application Server 7-2, and provides the backend functionality needed to run the Service. In turn, this includes application server logic and a data structure. The application server logic and data structure use a number of basic server functional blocks to implement the required functionality. A Service Client-Server Protocol 9-2 offers a communication mechanism between the Client Device 1-2 and the Application Servers 6-5. A Management Suite comprising a set of management Dashboards 6-8 and tools that the Business Entity 5-1 uses to configure, update, modify, manage, monitor, and analyze the Service. The Management Suite is accessed by the Business through the Retailer Portal and runs in the Retailer Application Server 7-1.

The primary End Users are the Consumers (i.e., the customers of all the Businesses). Any End User action or input while offline is stored in memory and sent to the Server when connectivity is restored. The Consumer Application Server 7-2 contains functionality to run the Application for each Business Entity and to manage the End Users (i.e., Consumers) of the Application. The role of the End User 9-1 defines who is at the "receiving end" of a Service. In other words, the End User 9-1 is the "entity" who "experiences" or "benefits" from a certain Service.

The Searchable Representation 9-13 includes a Business-Facing Service comprising a Mobile Search Engine optimization (SEO) Manager which allows the Business-Facing Service to monitor and enhance the Mobile Application Searchable URL by building upon Mobile Application Searchable URL and Searchable URL Tagging. Mobile Application Searchable URL which creates a Searchable Representation of the Mobile Application and Searchable URL Tagging that adds keywords to Mobile Application Searchable URL. Each Mobile Application is associated with a Searchable URL, which makes the corresponding Mobile Application Clients and their content searchable by search engines. SEO techniques can be used in the Searchable URL to boost the search results of the corresponding Mobile Application Clients and their content. The Searchable URL for each Business Entity is generated by the System Solution Automatic Application Generator 6-4 when the Mobile Application System for that Business Entity 5-1 is created.

Figure 10:
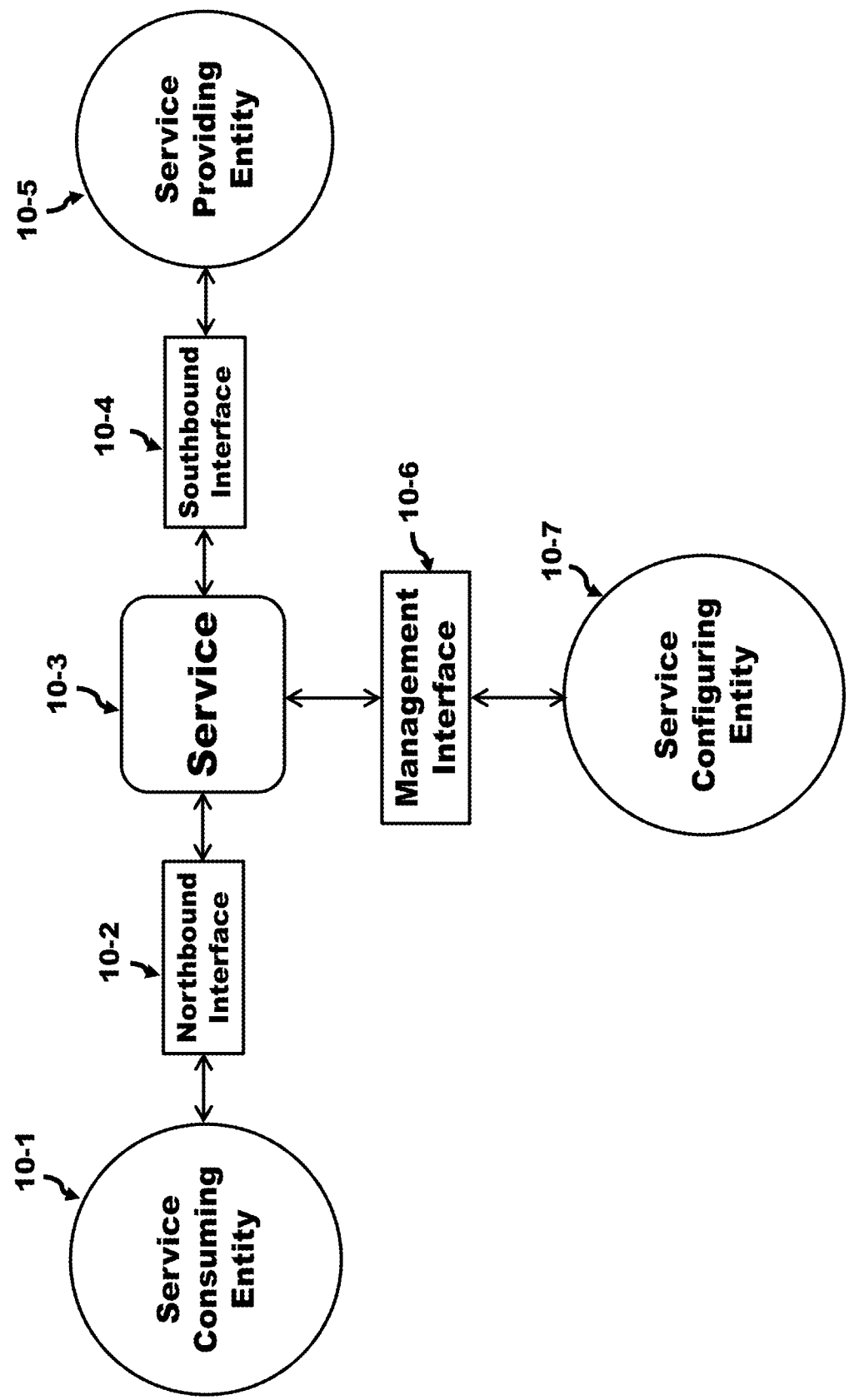
FIG. 10 illustrates the service between the consuming, providing and configuring entities in accordance with the present invention.

FIG. 10 depicts a pictorial representation of a Service 10-3. The Service 10-3 is at the center of the FIG. 10. The Service Consuming Entity 10-1 can be the End User or the target (for example, another service). The Service Providing Entity 10-5 can be the Business Entity 5-1 or the provider and originator while the Service Configuring Entity 10-7 can be the Business Entity 5-1 or the configurator. An interface between the Service 10-3 and the various entities exists. The Northbound Interface 10-2 is between the Service Consuming Entity 10-1 and the Service 10-3. The Southbound Interface 10-4 is between the Service Providing Entity 10-5 and the Service 10-3. Finally a Management Interface 10-6 (which is equivalent to a Dashboard) is between the Service Configuring Entity 10-7 and the Service 10-3.

A Service 10-3 is a set of functionality that is provided by a Service Providing Entity 10-5 to a Service Consuming Entity 10-1. The Service Consuming Entity 10-1 uses the Service 10-3 to accomplish a certain task or function or activity, for example, receiving and redeeming an electronic coupon on the Service Consuming Entity's cellphone. The Service Providing Entity 10-5 is the Provider or Originator, while the Service Consuming Entity 10-1 is the End User or Target. Typically, there is some type of interface between the Service 10-3 and the Service Providing Entity 10-5 and between the Service and the Service Consuming Entity 10-1. The nature of such interfaces depends on the Service Providing/Consuming Entity, and could be a User Interface (UI), an Application programming Interface (API), or some other type of interface. The term API refers to an interface between the System Solution and an External System, or to an interface between two Services. In other words, the term API loosely, in a logical connotation, is synonymous of a generic Interface. Such an Interface can be implemented in various ways, including as a physical API. For a given Service, the interface between the Service Providing Entity 10-5 and the Service 10-3 is referred to as the Southbound Interface 10-4, while the interface between the Service Consuming Entity 10-1 and the Service is referred to as the Northbound Interface 10-2. Services 10-3 can also have a Management Interface 10-6 through which they can be configured at runtime by a Service Configuration Entity 10-7.

In the case the Service Consuming Entity is itself a Service, for the "higher" Service using the other "lower" Service, such interface is the Southbound Interface 10-4. Conversely, for the lower Service being used by the higher Service, such interface is the Northbound Interface 10-2. A Service that is used by other Services as a building block of functionality can be invoked in different ways by different Services. For example, the Store Finder Service can be explicitly invoked by the Mobile Ordering Service to let the Consumer select a specific location where to place the order; the Store Finder Service can be implicitly invoked by a Customized Information Service to identify which specific location's menu should be displayed.

A Service 10-3 can be provided at different levels, depending on the Service 10-3 desired from the Service Consuming Entity 10-1. The Service Consuming Entity 10-1 is the Consumer or End User using a Mobile Client on his/her smartphone (Client Device). The Northbound Interface 10-2 is the means provided to the Consumer to interact with the Service and enter Consumer Input (if needed by the Service).

One example of Consumer Service is the Loyalty Service. In this Service, the Consumer is provided with the ability of accumulating points based on their purchases at a store, and eventually earning rewards when the number of points reaches a certain level. Other examples of Consumer Services can include Personalized Storefront Service, Real Time Promotion Service, Store Finder Service, and many others.

In a Business-Facing Service, the Service Consuming Entity 10-1 is the Business Entity 5-1. An example of a Business-Facing Service is the Retailer Profile Manager Service which provides a Retailer Portal through which a Business Entity 5-1 can create and manage a profile containing information about the Business Entity. A Service-Facing Service is where Services 10-3 can be built on top of other Services; in this case, the Service Consuming Entity 10-1 of a certain Service 10-3 is another Service. An example of a Service-Facing Service is the Redemption Service, which is used by, say, the In-Store Promotion Service to enable the redemption in the store of a promotion.

An Application generated by the System Solution is the collection of a number of Consumer-Facing Services and Business-Facing Services. The set of Services that comprise the Application is referred to as the Application Structure.

FIG. 11 provides a table 11-1 of a set of examples of Service Families 11-2 along with a set of Service Examples 11-3. The Greeting Service is the first row under the Service Family 11-2 contains the service examples of in-location greetings and automatic check-ins. The Personalized Experience Services row comprises a personalized promotion, and in-store only experiences, real-time experiences yield management, personalized storefront and context/location specific experiences. The Information Services row comprises a personalized information discovery, customized information, intelligent notifications/reminders/alerts, personalized/contextual guides and an intelligent navigator. The 2nd Screen Services row includes contextual product information, a contextual interactivity and a contextual virtual wall. The Correlation Services row comprises an interest relation between product correlation, a contextual correlation, a real time correlation, and information-based correlation and a social-based recommendation. The Value Services row contains intelligent shopping list/wallets, product trackers, store navigators, personal organizer calendar/concierge and reservations. The Convenient Services row includes a mobile ordering, a mobile deli counter and activity trackers. The Loyal Services row comprises a personalized loyalty, a purchase-based rewards, activity-based rewards and VIP services. The Communication Services row contains contextual feedback, contextual polls, personalized messaging, one-click communications and reviews. The Utility Services row comprises mobile payments, a price finder, social sharing and store finders.

Figure 12:
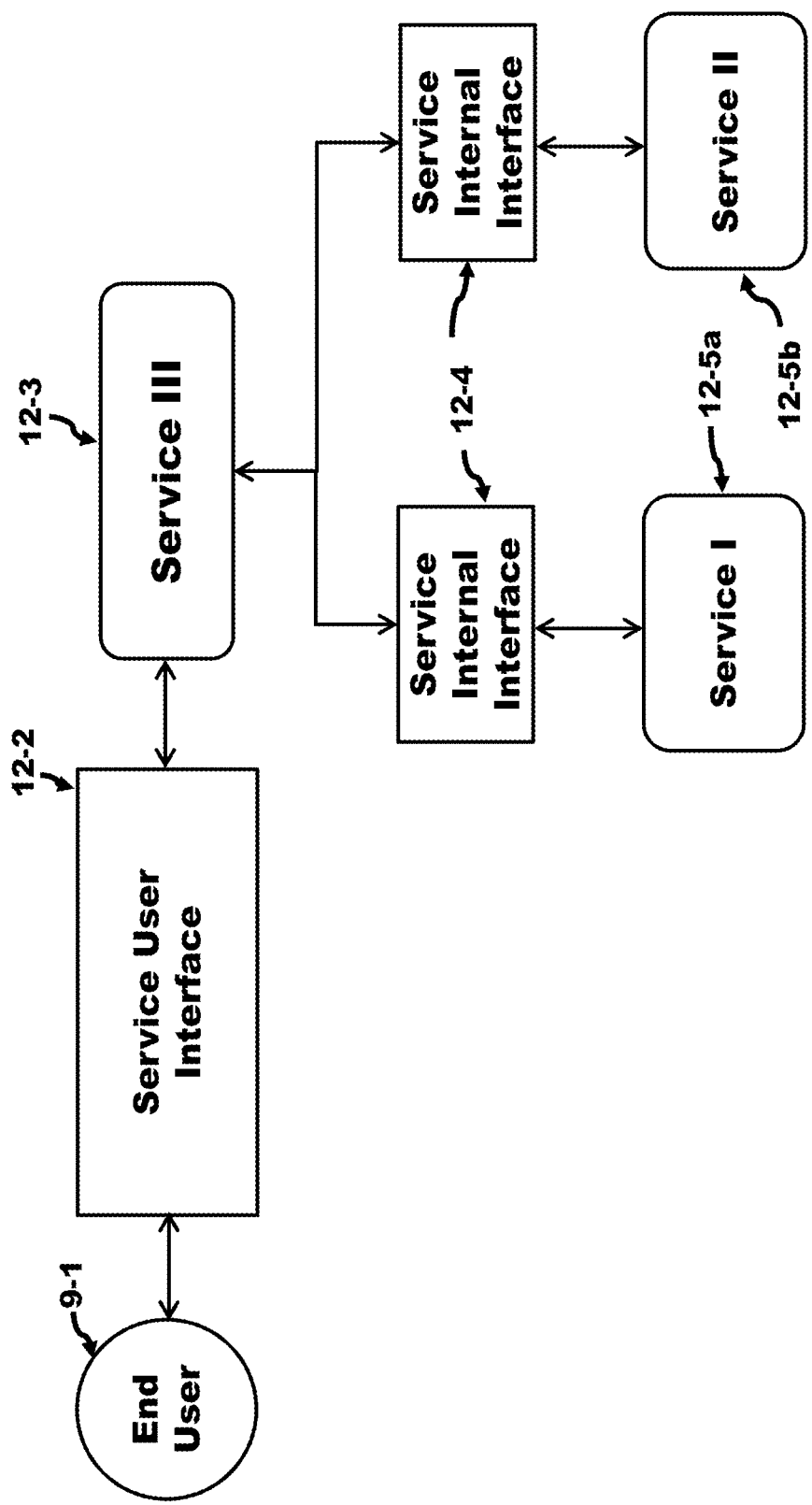
FIG. 12 illustrates the service being chained together to offer new Services in accordance with the present invention.

Services can be chained together to form a new Service 10-3. For example, in FIG. 12 Service I 12-5a can be Personalization while Service II 12-5b can be Promotion. These can be chained together through Service Internal Interface 12-4 to form a Service III 12-3 called Personalized Promotions. Typically, Dashboards 6-8 is provided to combine these various services together. The Service III 12-3 is applied to the Service User Interface 12-2 and then to the End User 9-1. Although two services 12-5a and 12-5b have been illustrated, a plurality of services can be combined together to address the End User requirements.

Figure 13:
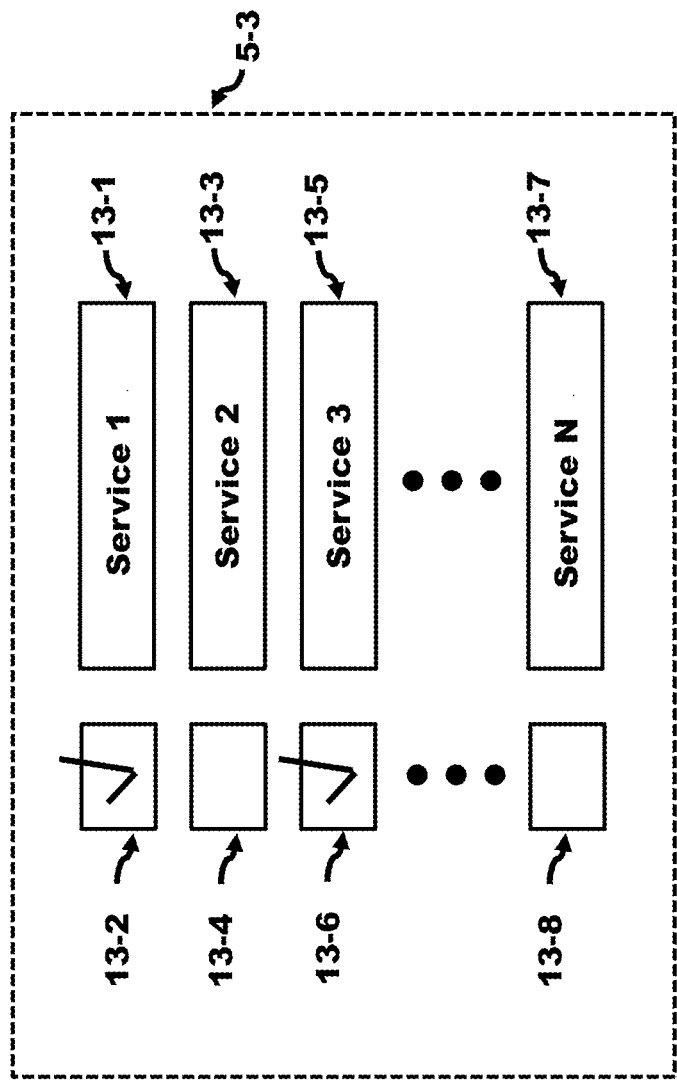
FIG. 13 shows a Service Selection menu for the Business Entity in accordance with the present invention.

A Service Selection 5-3 is depicted in FIG. 13. The menu of the list of Services and corresponding checkboxes are used by the Business Entity to select those Services. For example, the list of Services may include the service family examples 11-2 and Service examples 11-3 presented in FIG. 11. The Service Selection 5-3 is presented where a number of Services 1 13-1, Service 2 13-3, Service 3 13-5 and Service N 13-7 can be selected using checkboxes 13-2, 13-4, 13-6 and 13-8, respectively. This is a menu of available services, and the Business Entity chooses the ones that it wants implemented. Typically, these are end-user-facing Services, which are often built as a Chain of Services as presented in FIG. 12. The End User can be the Consumer who can be the actual End User 9-1 of the Application Client or the Business Entity 5-1. One application used by the Business Entity, for example, is Data Mining Services that produce analytics. When the Business Entity chooses a specific Service, it selects all the Services that are then chained together in order to build the final Service. For example, in FIG. 13, checkboxes 13-2 and 13-6 have been selected which presents one of the choice combinations of a Service selection 5-3.

Figure 14:
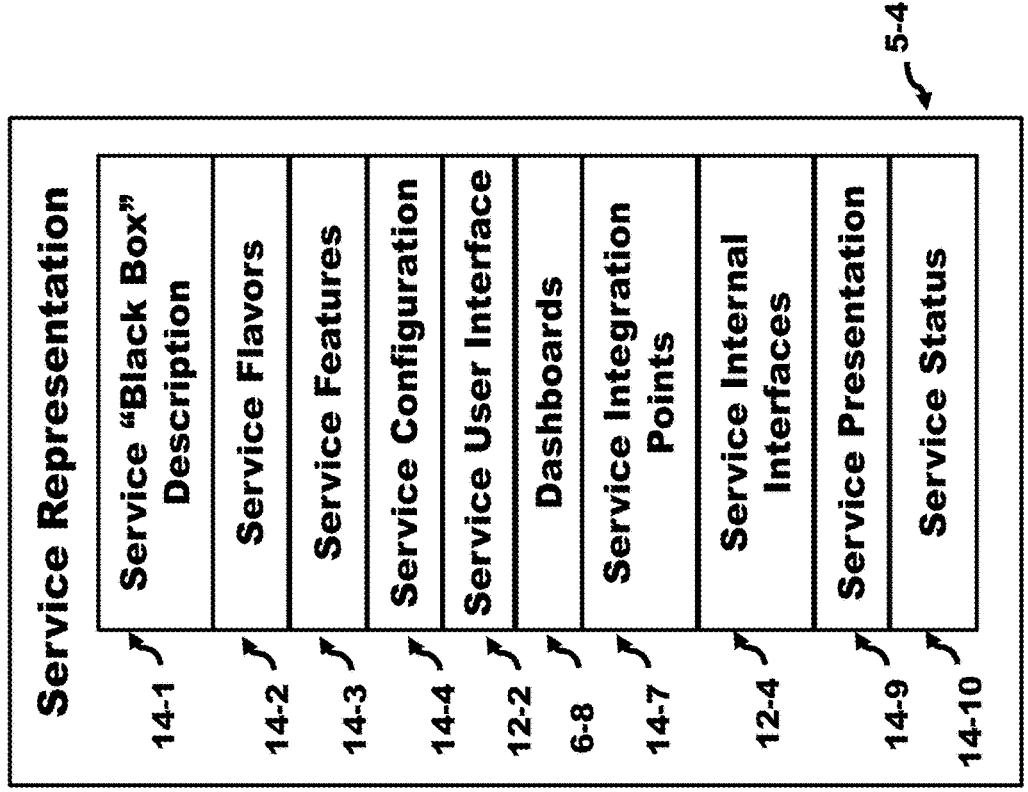
FIG. 14 shows one block structure of a Service Representation in accordance with the present invention.

FIG. 14 illustrates a block representing the various pieces of the Service Representation 5-4 with a list of high-level features, flavors, and options that allow the Business Entity 5-1 to customize the required Service 10-3. For each Service included in the Service Selection 5-3, there exists a Service Representation 5-4 describing that Service. The collection of all the Service Representations describing all the Service selected to be implemented in an Application constitutes the Service Representation of the Application and fully describes the functionality that needs to be implemented in the Application. The Service Representation is a high-level "behavioral" description of the Service 10-3 from an end-user viewpoint. The high-level feature list includes a Service "Black Box" Description 14-1, Service Flavors 14-2, Service Features 14-3, Service Configuration 14-4, Service User Interface 12-2, Dashboards 6-8, Service Integration Points 14-7, Service Internal Interfaces 12-4, Service Presentation 14-9 and a Service Status 14-10.

FIG. 15A depicts the Description and Examples of the Service "Black Box" Description 14-1. This provides a description of the Service 10-3 "as a Black Box". This description includes all aspects of the Service and provides a description of the Service "as a Black Box". This is a very high-level description (i.e., in plain English) of how the Service behaves from the point of view of an End User. It is typically a list of bullet points that describes the behavior of all aspects of the Service. The End User is both the Consumer who uses the Application Clients and the Business Entity who provides and manages the Service and can receive data and analytics back from the usage of the Service by the Consumer. The purpose of the "Black Box" Description is to give a high-level idea to the Business Entity of what the Service will provide to the Consumer and how the Service will be managed by the Business Entity. The "Black Box" Description is not an actual input to the Automatic Data Model Generation Process. The "Black Box" is simply provided to make the Service Selection process by the Business Entity easier and clearer.

FIG. 15A includes examples of the Service "Black Box" Description 14-1 as it applies to different Services, such as: Real Time Promotion Service, Real Time Promotion Personalized to Shopping List Service and Electronic Loyalty Service—"'Key Chain" Card. For example, the Service "Black Box" Description for the Real Time Promotion Service may consist of a list of bullet points describing the behavior of the Service. The description may read as follows. A Promotion is created via a Dashboard. The promotion includes a product description, an offer, and an expiration date/time. The Promotion is distributed in real time to the Mobile Application Clients in the vicinity of a desired store (i.e., within a certain radius from the store). When the Mobile Application Clients receive the Promotion, they display a Notification alerting the Consumer that the Promotion is available. The Consumer can redeem the Promotion and receive the discount. Once the expiration date/time is reached, the Promotion is not displayed in the Application Client and cannot be used. Another example applies to the Real Time Promotion Personalized to Shopping List, which is an example of Service Chaining: it chains three Services, i.e., Real Time Promotion Service plus Personalization Service plus Shopping list Service. The Promotion behaves the same as described above. When the Promotion is created, keywords can be added via a Dashboard. The keywords are used to match the Promotion with items in the Shopping list. The Shopping List Service is a list of items that the Consumer can enter through their Application Client. The Promotion is distributed in real time only to the Mobile Application Clients in the vicinity of a desired store which have in their shopping List keywords that match the items. A third example applies to the Electronic Loyalty Service—"'Key Chain" Card. The Service "Black Box" Description for this Service would recite as follows. The Electronic Loyalty Service—"'Key Chain" Card is an electronic Loyalty Card is associated to each Consumer. The electronic Loyalty Card is displayed in the Mobile Application Client and has a barcode that can be scanned at the Point of Sale (PoS) to identify the Consumer. A point for each dollar that the Consumer spends on the purchase is added to the Loyalty Card from the PoS. Consumer redeems rewards when a pre-defined number of points are accumulated. Consumer can check the balance of points on his/her card at any time from the Application Client. The Electronic Loyalty Service can be tied to a card. This "Key Chain" Card is the electronic equivalent of a physical Loyalty Card that Consumers carry in their Key Chain (e.g., a supermarket Card) or in their wallet and use the cord when the Consumer is at the store.

FIG. 15B depicts the description and examples of the Service Flavor 14-2. This provides a description of the Service 10-3 with examples. A Service can have a number of variations or flavors, which accommodate different use cases. The Business Entity 5-1 selects which flavors it wants. The flavors may not be mutually exclusive. The Service Flavors 14-2 consist of a high level description of what the Service looks like. If needed for clarity to the Business Entity, there can be a Black Box Description for each flavor. The selected flavors 14-2 are an input to the Automatic Data Model Generation Process, since the selected flavors determine the defining features of the Service.

Service Flavors 14-2 are variations of a Service 10-3, which accommodate different user cases. FIG. 15B includes examples of Service Flavors for two Services: Electronic Loyalty Service and Promotion Service. The Electronic Loyalty Service comprises two Service Flavors. A first flavor is an Electronic Loyalty Key Chain Card Service and is the electronic equivalent of a physical loyalty card carrying a bar code (e.g., the supermarket membership cards that people carry around in their key chain). The Mobile Application Client displays a barcode, which is scanned at the PoS at the store, and identifies the Consumer. A second flavor is an Electronic loyalty Punch Card Service which is the electronic equivalent of a physical loyalty punch card (e.g., a "buy 10 sandwiches get 1 free" card that gets punched by the cashier every time the Consumer buys a sandwich). In this case, the Business may display a QR code at the PoS at the store, the mobile Application Client scans the QR code, which identifies the Purchase and "punches" the electronic card. A first example of flavors for the Promotion Service includes a Real Time Promotion Service. These promotions can be created, distributed, and retired in real time (e.g., a "20% off for the next two hours" Promotion). A second example of flavors for the Promotion Service includes a Location Specific Promotion Service. These promotions are valid only at a specific, configurable store within a chain of stores.

FIG. 15C and FIG. 15D depict the Description and Examples of the Service Features 14-3. This provides a description of the Service 10-3 with examples. Service Feature 14-3 specifies the available relevant features of a Service. The list of relevant features depends on the Service. Some features depend on the Service Flavor. This looks like a menu of features, and the Business Entity 5-1 selects the features that it needs. Some features may be defined as "default" features and are provided in the Application without the need for the Business Entity to explicitly select them. Some features, when selected, automatically select other required features, which are necessary for the feature to work properly. Some features, when selected, automatically require certain Integration Points to be defined in order for the Service to work as expected. The Service Features 14-3 are an important input of the Automatic Data Model Generator 6-2.

FIG. 15C and FIG. 15D provides examples of Service Features for two Services: Promotion Service and Electronic Loyalty Service. The Service Features for Promotion Service include the following. A Type of Promotions: obtaining dollar discount (e.g., $5 off), a percentage off the price (e.g., 10% off) and offers to buy X get Y free (e.g., buy one get one free). A list of available redemption mechanisms: a redemption mechanism via bar code (e.g., the application displays a bar code that identifies the promotion and can be scanned at the PoS to redeem it). This mechanism typically requires an Integration Point with the POS system, since the bar code has to be known by the PoS system in order to property account for the promotion. A redemption mechanisms via a QR code (e.g., the application displays a QR code that identifies the promotion and can be scanned at the PoS to redeem it.); a redemption mechanism via "redeem button" (e.g., the application displays a "redeem button" that the Consumer can tap when at the PoS to receive the discount); and a redemption mechanism via short code (e.g., the application displays a short code that the Consumer can give to the Cashier in order to receive the discount). The Redemption Scope incudes: Redemption occurs In-store only (e.g., the promotion) or redemption occurs In-store plus home delivery. The Service Features for the Electronic loyalty Service includes: Loyalty Events (i.e., events that generate points to be added to a loyalty card). This includes: Offer Purchase-Based Loyalty Points. Consumer gets loyalty points associated to certain purchases (e.g., one point per dollar spent at the store); or Non-Purchase-Based Loyalty Points. The Consumer gets Loyalty points for actions other than purchase (e.g., enter the store more than once a month or achieving a Reward Threshold). Service Features for the Electronics Loyalty Service also includes Reward Threshold: Single Threshold. The Consumer gets a reward when he/she accumulates a number of loyalty points equal to the Reward Threshold. Multiple Thresholds. If multiple thresholds occur, then the Consumers get different rewards when he/she accumulates points equal to one of a number of available Reward Thresholds. Loyalty levels can be Single loyalty level, Multiple loyalty levels (e.g., Silver and Gold loyally levels, each Consumer is associated with one level depending on the frequency he/she visits a store, Silver level gets one loyalty point per dollar spent, or Gold level gets two loyalty points per dollar spent).

FIG. 15E depicts the Description and Examples of the Service Configuration 14-4. Service Configuration specifies relevant parameters that need to be specified by the Business for the Service 10-3 to be configured. The configuration parameters typically go hand-in-hand with the Service Features 14-3. Service Configuration 14-4 specifies relevant values of parameters that need to be specified by the Business Entity 5-1 for the Service to be configured. The configuration parameters typically depend on the selected Service Features 14-3. Each of the selected Service Features 14-3 can require one or more Configuration Parameter. Some of the Configuration Parameter Values are required before the Application can be deployed (e.g., Store Locations for Location-Specific Promotions). Some of the Configuration Parameter Values are entered once the Application is deployed, or are entered when the Data Model 6-3 is updated (e.g., a new Promotion is created and distributed in a Promotion Service). The Configuration Parameter Values are entered either via Dashboards 6-8 such as, all the data required to set up a new Promotion, or via Service Integration Points (e.g., a file with all the Store Locations is read by the Automatic Data Model Generation Process). Some Services can have Configuration Parameter Values that are entered by the Consumer via the Application Client when the Service is run. The Automatic Data Model Generation Process validates that all the Configuration Parameter Values that are needed to run the Service have been entered. The Service Configuration Process alerts the Business Entity (or the Consumer) if some required value has not been entered.

FIG. 15E provides example of Service Configuration for two Services: Promotion Service and Electronic Loyalty Service. Service Configuration for the Promotion Service includes Store locations such as the name of store, address, GPS coordinates, or size of the store. Bar codes identify the Promotions. Redemption Rules which specify under what circumstances a Promotion should be redeemed; examples of Redemption Rules include: offer a specific Promotion that is only valid before 6:00 pm on weekdays and a Promotion can only be redeemed once. Promotion Data includes product description, offer value, expiration date, or product picture. Service Configuration for the Electronic Loyalty Service comprises Loyalty values such as one loyalty point per dollar spent. The reward threshold values offer reward items associated to each Reward thresholds. The Reward rules offer loyalty points that expire after one year.

The Service User Interface 12-2 illustrated in FIG. 15F specifies the functionality of the User Interface with the Consumer End User. This describes each interface and the parameters passed through those interfaces.

An example of a Service User Interface 14-5 includes Promotion Service user Interface. The Promotion Service user Interface comprises Displays Promotion Data in multiple levels of detail (e.g., view showing Promotion summary, view showing Promotion details), allowing grouping promotions in categories and provides multiple levels of navigation where the selection comprises category and a selection of promotion within category. Bar Codes are displayed to identify the promotion.

Dashboards 6-8, as shown in FIG. 15G, specify the functionality of the Dashboards 6-8. This Service 10-3 describes each interface and the parameters passed through those interfaces. The Dashboards 6-8 are the interfaces that get automatically generated for the Business Entity 5-1 to manage the Service 10-3 and update it. This describes the functionality provided in the Dashboards 6-8. The functionality of the Dashboards 6-8 strictly depends on the selected Service Features 14-3 and is directly derived from the portion of the Service that is changeable.

An example includes Promotion Service Dashboard. The Promotion Service Dashboard allows the creation and distribution of a Promotion by entering the name of Promotion, Promotion code, product description, offer value, and start date/time, expiration date/time or keywords.

Service Integration Points 14-7 illustrated in FIG. 15H specify the Integration Points with External Systems. A Service 10-3 can be using Service Integration Points 14-7 with other systems and databases belonging to the Business Entity 5-1 or to other entities. Service Integration Points 14-7 are used to get Business Data input (or provide data output) or to get other types of Data (e.g., content) that may be needed to run the Service. Service Integration Points are implemented by generating interfaces specified as a list of inputs, outputs and parameters that are passed through the interface.

Examples include: Promotion Service Integration Points. The Promotion Service Integration Points are for PoS Integration to exchange Promotion Codes for each Promotion and receive Purchase Data for each consumer. External Database Integration also ingests store locations.

As shown in FIG. 15I, Service Internal Interfaces 12-4 specify the interfaces of a Service 10-3 which may be using other Services, accessible via Internal Service Interfaces. The Internal Service Interfaces are specified as a list of inputs, outputs and parameters that are passed through the interface. The Internal Service Interfaces typically do not need to be made visible to the Business Entity.

Examples include: Promotion Service using Bar Coding and Redemption Services. The Promotion Service using Bar Coding uses a Bar Coding Service Interface for input to identify a unique number identifying an item. A barcoding label identifies an output barcoding. The Redemption Services Interface uses as an input the Promotion_ID and Consumer_ID values while the Interface uses as output the valid or invalid redemption.

Figure 15J:

Service Presentation 14-9 as depicted in FIG. 15J specifies how the service can be presented to the Consumer. This specifies the UI of the Application Client. This includes a set of Presentation Templates 15-1, which correspond to one or more UI Regions, which in turn correspond to Dashboards 6-8. The set of possible Presentation Templates 15-1 depends on the desired Service Flavors 14-2 and Service Features 14-3. This specifies how the service can be presented to the Consumer, i.e., defines how the User Interface with the Consumer appears. The Business Entity 5-1 selects which Presentation Template(s) it prefers. The selected Presentation Template(s) may depend on the Business Data (e.g., in a Promotion Service. Primary Service Presentation is a Carousel, Horizontal if there are less than 10 Promotions, a Scrollable List if there are more than 10 but less than 50 Promotions, or a Category List if there are more than 50 Promotions). Service Presentation 14-9 typically includes a Primary Service Presentation which is how the "bulk" of the Service can be presented. Highlighters are additional UI Regions that can be used in the Application Client to highlight or summarize certain relevant pieces of the Service (e.g., the Loyalty Point balance counter can be displayed in the landing page).

Example of Service Presentation 14-9 for Promotion Service includes the following. Available Presentation Templates 15-1 with examples including: Primary Service Presentation and Highlighters. The Primary Service Presentation is a Carousel that is Horizontal with detailed view on tapping, Carousel that is Vertical with detailed view on tapping, Small Scrollable Tray with single zoomed Promotion View detailed view on tapping, Scrollable List with detailed view on tapping, Category List with Scrollable Tray per category and detailed view on tapping, or Individual Promotion with detailed view on tapping. The Highlighters provides a Greeting message such as "You have X promotions" in the landing page. Alerts are also flashed of in-store promotions on selected pages.

As depicted in FIG. 15K, Service Status 14-10 is where the Business Entity 5-1 can specify one of two Service Statuses: Active and Dormant. Active is a Service that is actively running, deployed, and exposed to the Consuming Entity (typically the Consumer) via the User Interface. Dormant is a Service that is disabled, but all the Application Clients for that Service are generated. This includes functionality, interfaces, and presentation. The Status of the Service is set by the Business and can be changed at any time. Using the Dormant Status, the Business Entity can create the Service and keep it disabled but ready for future use.

Figure 16:
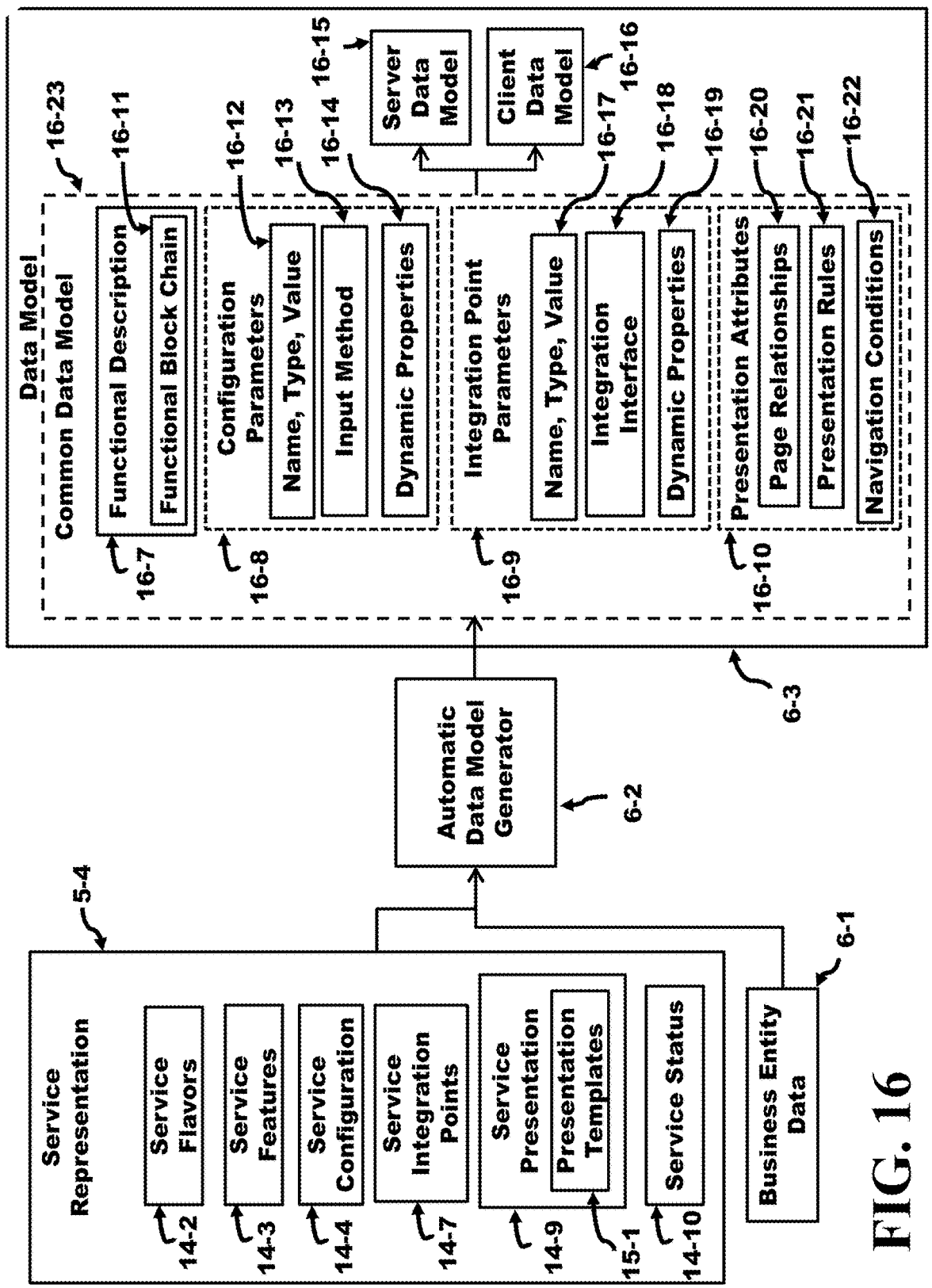
FIG. 16 illustrates the Automatic Data Model Generator in more detail (from the Service Representation to Data Model) in accordance with the present invention.

FIG. 16 illustrates the Automatic Data Model Generator 6-2 after being segmented in more detail (from Service Representation to Data Model). The Automatic Data Model Generator 6-2 takes the Service Representation 5-4 and the Business Entity Data 6-1 and generates all the fields that are included in the Data Model 6-3. The Service Representation 5-4 includes Service Flavors 14-2, Service Features 14-3, Service Configuration 14-4, Service Integration Points 14-7, Service Internal Interfaces 12-4, Service Presentation 14-9 which comprises the Presentation Templates 15-1 and the Service Status 14-10. Once the Data Model 6-3 is generated, the Common Data Model 16-23, the Server Data Model 16-15 and the Client Data Model 16-16 are contained within. The Server Data Model 16-15 is the portion of the Data Model 6-3 that is relevant for the generation and operation of all parts of the system other than the Application Clients. The Client Data Model 16-16 is the portion of the Data Model 6-3 that is relevant for the generation and operation of the Application Clients.

The Common Data Model 16-23 includes several structures: Functional Description 16-7, Configuration Parameters 16-8, Integration Point Parameters 16-9 and Presentation Attributes 16-10.

The Functional Description 16-7 defines the functionality that needs to be provided by the Application. The Functional Description 16-7 comprises the Functional Block Chain 16-11, which is the list of Basic Server Functional Blocks and Native Client Functional Blocks that need to be used by the Automatic Application Generator 6-4 to generate all the components of the Application. The Functional Block Chain 16-11 also defines in which order the blocks should be used (if there is a hierarchy). Since the Services can be hierarchical, the Functional Description 16-7 is also hierarchical. The Functional Description 16-7 is derived by the Automatic Data Model Generator 6-2 from the selected Service Flavors 14-2, Service Features 14-3 and Service Internal Interfaces 12-4. For every one of the Service Flavors 14-2 and Service Features 14-3, there is a list in memory that defines the Functional Blocks that should be used. The Service Internal Interfaces 12-4 define the hierarchy of Services that are needed (if any) to build a certain Service 10-3. In the case of a Service that uses other Services, the Automatic Data Model Generator 6-2 identifies the blocks that are used by each Service. The Functional Description 16-7 consists of a series of checkmarks that identify which blocks are used and in which order (if there is a hierarchy).

The Configuration Parameters 16-8 is a list of all the Parameters that are needed to implement the selected Flavor (s) and Features. Each configuration Parameter is described by Name, Type and Value 16-12 which are derived from the Service Configuration 14-4. Service Configuration 14-4 depends on Service Features 14-3 and Service Flavors 14-2 (as explained in FIGS. 15B-D). Type specifies the format of the parameter and whether the parameter is an input (i.e., a value needs to be entered for that Parameter) or an output (i.e., a value is generated and displayed for that Parameter by the Service). The Input Method 16-13 for each Parameter specifies how (and by whom) the parameter value is entered. The value can be entered via a Service Integration Points 14-7, or via a Service Internal Interfaces 12-4, or via a Dashboard 6-8, or by the End User 9-1 via the Application Client, or be derived by the Business Entity Data. The Automatic Data Model Generator 6-2 goes over the list of Configuration Parameters and determines the Input Method by looking at Service Integration Points 14-7, and Service Presentation 14-9 (note that Presentation Templates 15-1 defines which parameters can be entered via the Dashboards 6-8). The Dynamic Property 16-14 defines when the value for the parameter is entered and when it can (or cannot) be changed. The Automatic Data Model Generator 6-2 determines the Dynamic Property 16-14 by looking at Service Features 14-3. The Dynamic Property 16-14 of a parameter can be one of: a Settings where the value has to be entered before the Service 10-3 is presented to any end user (e.g., the address of a store for a Service that should be offered only in that store); or an Initialization where the value has to be entered before the Service is presented to a specific End User 9-1 (e.g., the barcode identifying a specific consumer in an Electronic Loyalty Card Run Time); or a value can be entered at any time (e.g., the data describing a new Promotion) The Dynamic Property 16-14 also defines whether the value can be changed and when.

The Integration Point Parameters 16-9 are the Configuration Parameters 16-8 that are entered via Service Integration Points 14-7. Each Configuration Parameter 16-8 is described by its corresponding Name, Type and Value 16-17 that are derived from the Service Configuration 14-4. Service Configuration 14-4 depends on Service Features 14-3 and Service Flavors 1-2 (as explained in FIGS. 15B-D). The Integration Point Parameters 16-9 has a corresponding Dynamic Property 16-19 is derived in the same way as mentioned in Configuration Parameters 16-8. In the Integration Point Parameters 16-9, the whole Integration Interface 16-18 is stored in the Data Model 6-3. For example, all the fields and formats of all the messages are in the Integration Interface 16-18 of the Integration Point Parameters 16-9.

The Presentation Attributes 16-10 comprise the Page Relationships 16-20. The User Interface in the Application Client consists of a collection of "Pages" (the notion of Page is similar to the one in a website, each Page presents a User Interface to one or more Services and the end user can navigate from one Page to another). The Presentation Template 15-1 in the Service Presentation 14-9 consists of one or more Pages. The Template also defines the relationships among those Pages (e.g., there is a button in a Page that, when tapped, leads to another Page). The Template defines Primary Service Presentation Rules 16-21 (which consists of one or more Pages) and Highlighters (which typically are displayed in yet other Pages). Page Relationships 16-20 are derived from the Presentation Templates 15-1. The Page Relationships 16-20 are a matrix where the rows are the starting Pages and the columns are the ending Pages and the values in the matrix describe how any two Pages are connected. The relationship between Pages can be constant (i.e., there is a button in a Page that always appears and leads to the other Page), or conditional (i.e., there is a button in a Page that appears only if certain conditions are verified). Navigation Conditions 16-22 are conditional relationships that correspond to Navigation Conditions 16-22 in the Presentation Template 15-1. For each Navigation Condition 16-22, there is a Parameter that contains a Value that is used to compute the Navigation Condition at runtime (this is explained in detail in U.S. patent application Ser. No. 13/833,775 titled "Dynamic User Interface Delivery System" filed on Mar. 15, 2013 which is incorporated in reference in its entirety). What is relevant in this application is that the Navigation Condition 16-22 and the associated Parameter(s) are automatically derived from the Presentation Templates 15-1 and stored in the data model. The Presentation Templates 15-1 contain buttons, which can be associated with Navigation Conditions Presentation Rule. They are derived from the Presentation Templates 15-1. The Presentation Templates 15-1 contain Widgets (e.g. Carousel or List Display), which can be associated with Presentation Rules (for example Functional Description, use Carousel if Number_of_Promotions <10, use List Display if Number_of_Promotions >=10).

Figure 17:
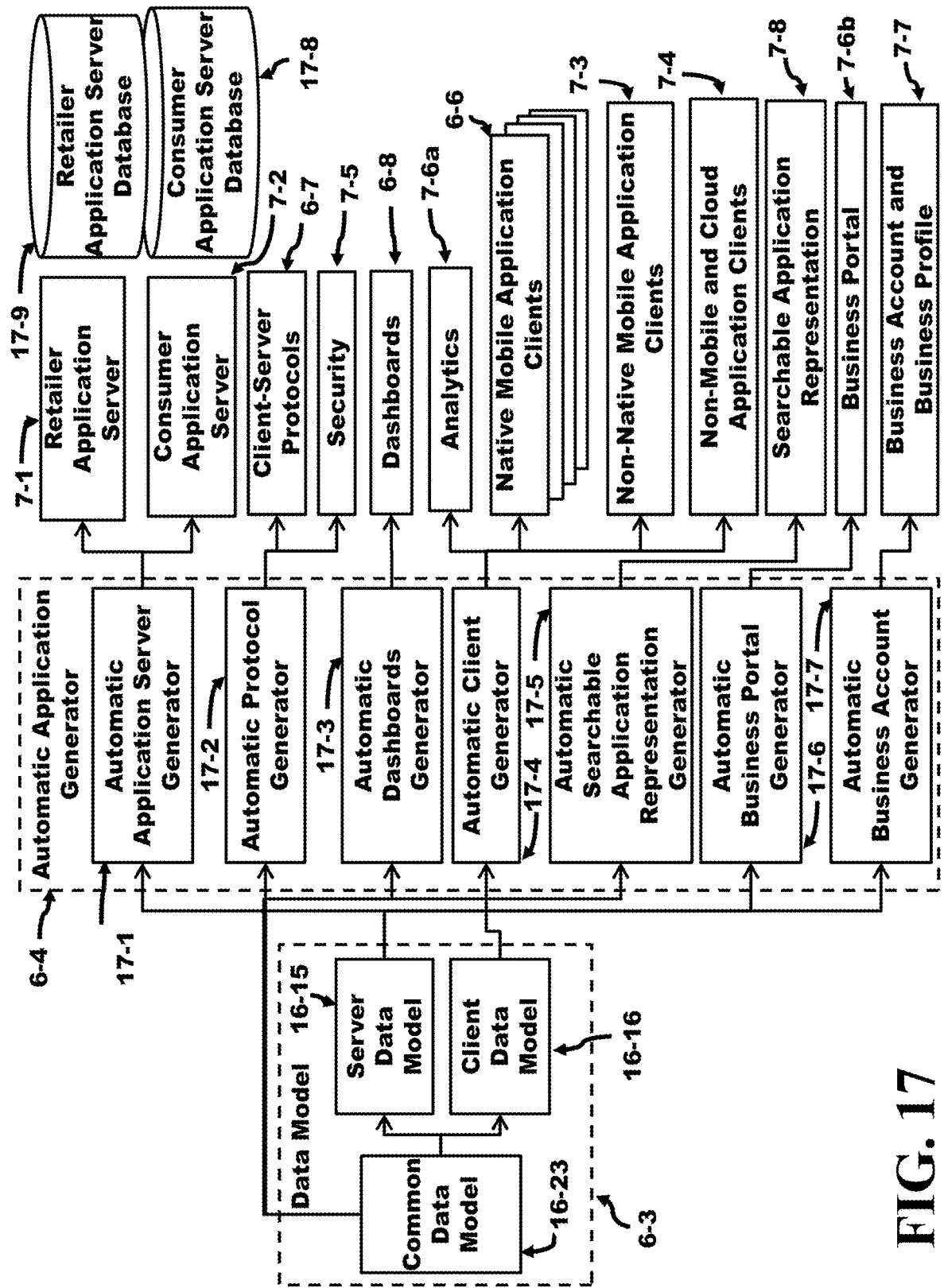
FIG. 17 depicts an Automatic Application Generator in more detail (from the Data Model to Applications Components) in accordance with the present invention.

FIG. 17 illustrates the Automatic Application Generator 6-2 in more detail (from Data Model to the output applications and features). The Data Model 6-3 consists of the Common Data Model 16-23 that couples to the Server Data Model 16-15 and the Client Data Model 16-16. The output of the Data Model 6-3 is applied to the Automatic Application Generator 6-4. The Automatic Application Generator 6-4 comprises the Automatic Application Server Generator 17-1 coupled to a Server Data Model 16-15, the Automatic Protocol Generator 17-2 coupled to a Common Data Model 16-23, the Automatic Dashboards Generator 17-3 coupled to a Common Data Model 16-23, the Automatic Client Generator 17-4 coupled to a Client Data Model 16-16, the Automatic Searchable Application Representation Generator 17-5 coupled to a Common Data Model 16-23, the Automatic Business Portal Generator 17-6 coupled to a Server Data Model 16-15 and the Automatic Business Account Generator 17-7 coupled to a Server Data Model 16-15. The Application Components generated by the Automatic Application Generator 6-4 are shown on the right of FIG. 17 and includes the Retailer Application Server 7-1 and the corresponding Retailer Application Server Database 17-9, the Consumer Application Server 7-2 and the corresponding Consumer Application Server Database 17-8, the Client-Server Protocols 6-7, Security 7-5, the Dashboards 6-8, the Analytics 7-6a, the Native Mobile Application Clients 6-6, the Non-Native Mobile Application Clients 7-3, the Non-Mobile and Cloud Application Clients 7-4, the Searchable Application Representation 7-8, the Business Portal 7-6b and the Business Account and Business Profile 7-7. FIG. 17 provides a portion of the figure in FIG. 7A with significantly more detail.

Figure 18A:
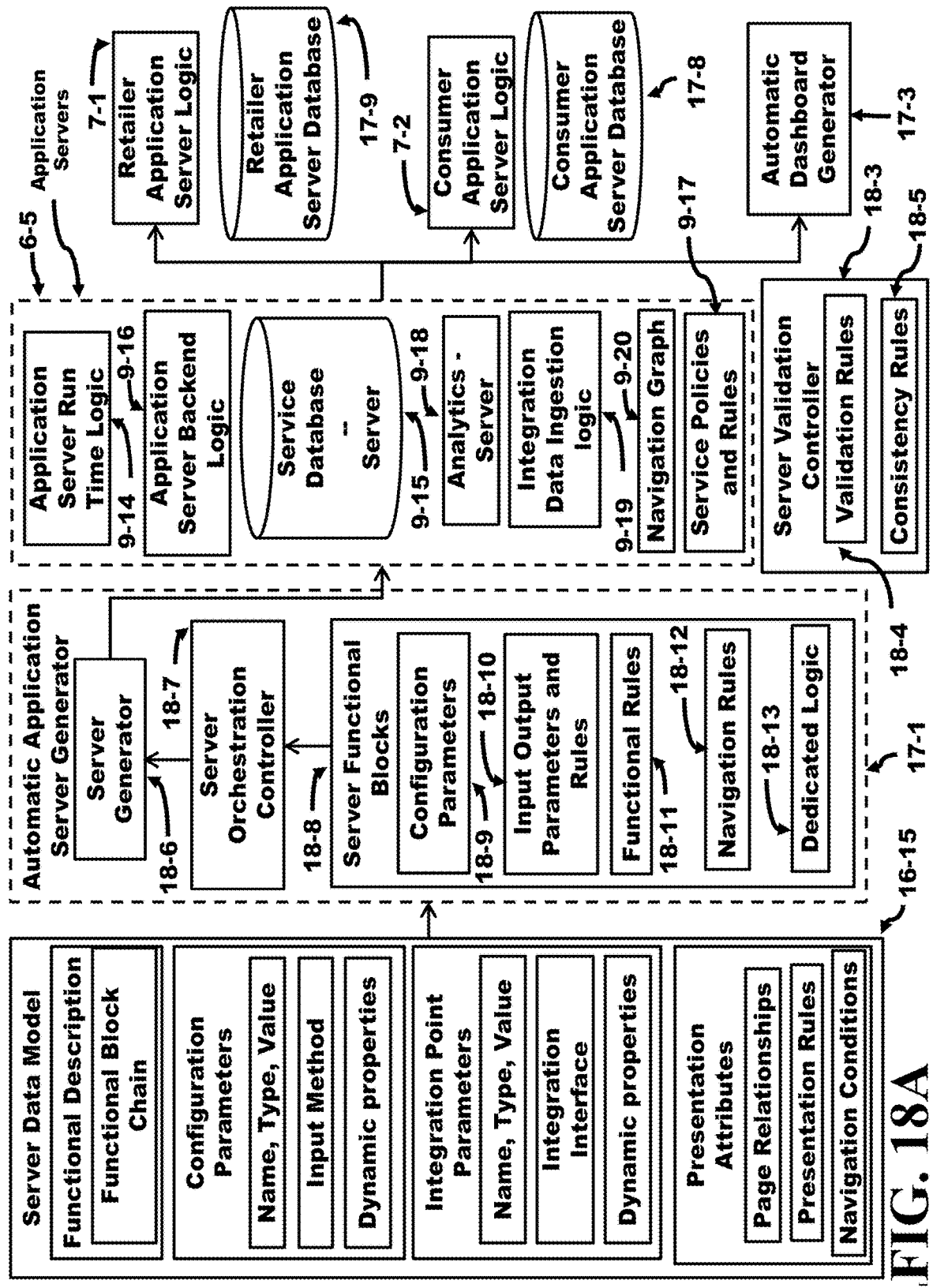
FIG. 18A illustrates an Automatic Application Server Generator in accordance with the present invention.

FIG. 18A illustrates a Server Data Model 16-15 coupled to the Automatic Application Server Generator 17-1. The output of this Automatic Application Server Generator generates the Application Servers 6-5 where the final output is the Retailer Application Server Logic 7-1, the Retailer Application Server Database 17-9, the Consumer Application Server Logic 7-2, the Consumer Application Server Database 17-8 and the Automatic Dashboard Generator 17-3. The Automatic Application Server Generator 17-1 contains Server Functional Blocks 18-8 and a Server Orchestration Controller 18-7 that applies the final output to the Server Generator 18-6. The Server Functional Blocks 18-8 comprise the Configuration Parameters 18-9, Input Output Parameters and Rules 18-10, Functional Rules 18-11, Navigational Rules 18-12 and a Dedicated Logic 18-13. These are the components necessary to help the Automatic Application Server Generator 17-1 to generate its outputs. Inside the Application Servers 6-5 which receives the output from the Automatic Application Server Generator 17-1 is the Application Server Runtime Logic 9-14, the Application Server Backend Logic 9-16, a Service Database Server 9-15, Analytics-Server 9-18, Integration Data Ingestion Logic 9-19, a Navigational Graph 9-20 and Service Policies and Rules 9-17. The Server Validation Controller 18-3 uses the Validation Rules 18-4 and the Consistency Rules 18-5 to help make this generation possible and guarantee that the generated functionality is correct. One of the outputs of generates the Application Servers 6-5 is an input that is used by the Automatic Dashboard Generator 17-3 which will be discussed in detail shortly.

Figure 18B:
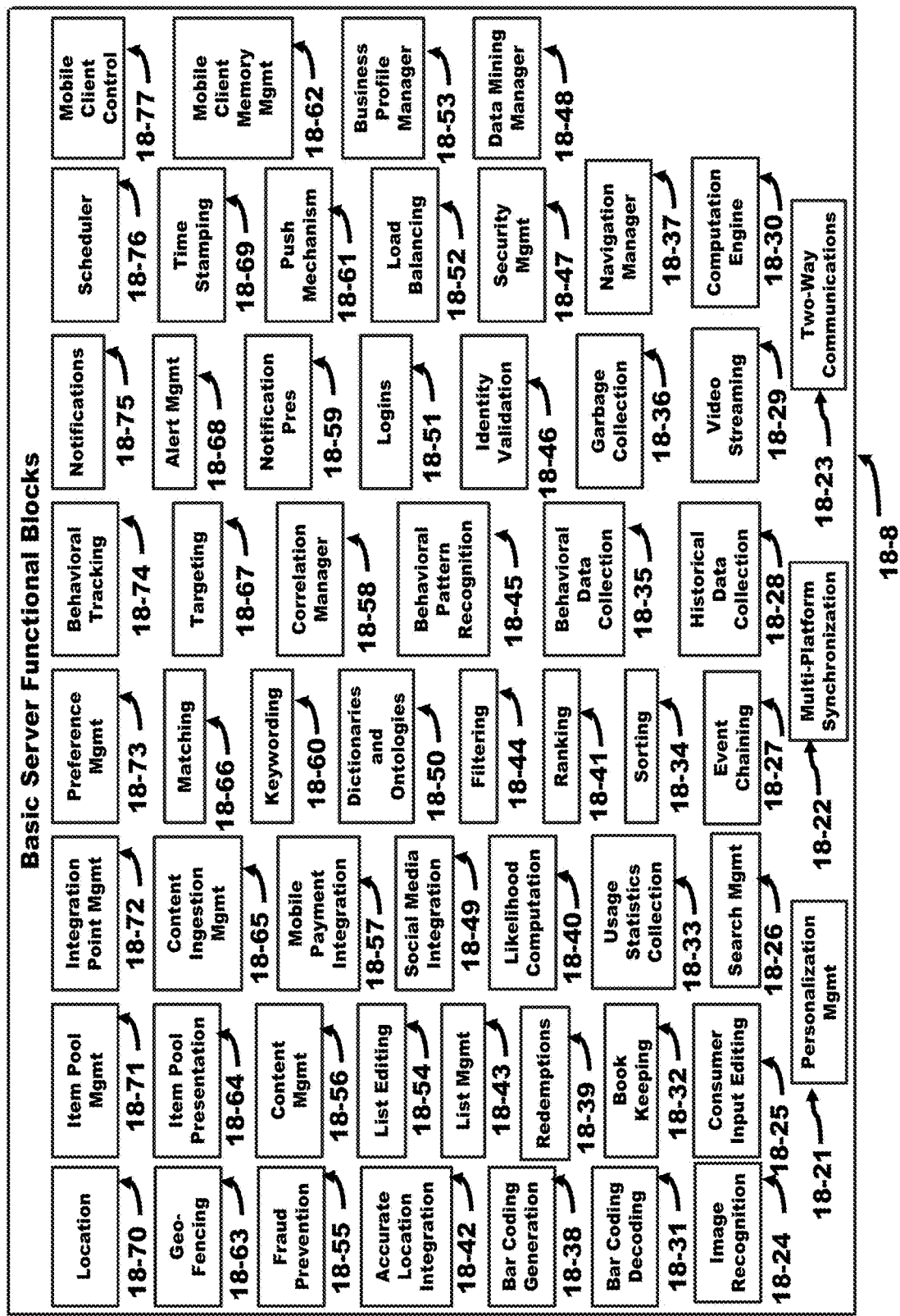
FIG. 18B depicts the Basic Server Functional Blocks of FIG. 18A in accordance with the present invention.

FIG. 18B illustrates the Basic Server Functional Blocks 18-8 that are used to help the Automatic Application Server Generator 17-1 to generate the Application Servers 6-5. The Basic Server Functional Blocks 18-8 include boxes 18-21 through 18-77. These basic server functional blocks are the personalization management 18-21, Multi-Platform Synchronization 18-22, Two-Way Communications 18-23, Image Recognition 18-24, Consumer Input Editing 18-25, Search Mgmt 18-26, Event Chaining 18-27, Historical Data Collection 18-28, Video Streaming 18-29, Computation Engine 18-30, Bar Coding Decoding 18-31, Book Keeping 18-32, Usage Statistics Collection 18-33, Sorting 18-34, Behavioral Data Collection 18-35, Garbage Collection 18-36, Navigation Manager 18-37, Bar Coding Generation 18-38, Redemptions 18-39, Likelihood Computation 18-40, Ranking 18-41, Accurate Location Integration 18-42, List Mgmt 18-43, Filtering 18-44, Behavioral Pattern Recognition 18-45, Identity Validation 18-46, Security Mgmt 18-47, Data Mining Manager 18-48, Social Media Integration 18-49, Dictionaries and Ontologies 18-50, Logins 18-51, Load Balancing 18-52, Business Profile Manager 18-53, List Editing 18-54, Fraud Prevention 18-55, Content Mgmt 18-56, Mobile Payment Integration 18-57, Correlation Manager 18-58, Notification Pres 18-59, Keywording 18-60, Push Mechanism 18-61, Mobile Client Memory Mgmt 18-62, Geo-Fencing 18-63, Item Pool Presentation 18-64, Content Ingestion Mgmt 18-65, Matching 18-66, Targeting 18-67, Alert Mgmt 18-68, Time Stamping 18-69, Location 18-70, Item Pool Mgmt 18-71, Integration Point Mgmt 18-72, Preference Mgmt 18-73, Behavioral Tracking 18-74, Notifications 18-75, Scheduler 18-76 and Mobile Client Control 18-77. These blocks are used in FIG. 18A which is within the Basic Server Functional Block 18-8 and provide functions related to servers in terms of management, filtering, synchronization, statistics, likelihood, etc.

Figure 19A:
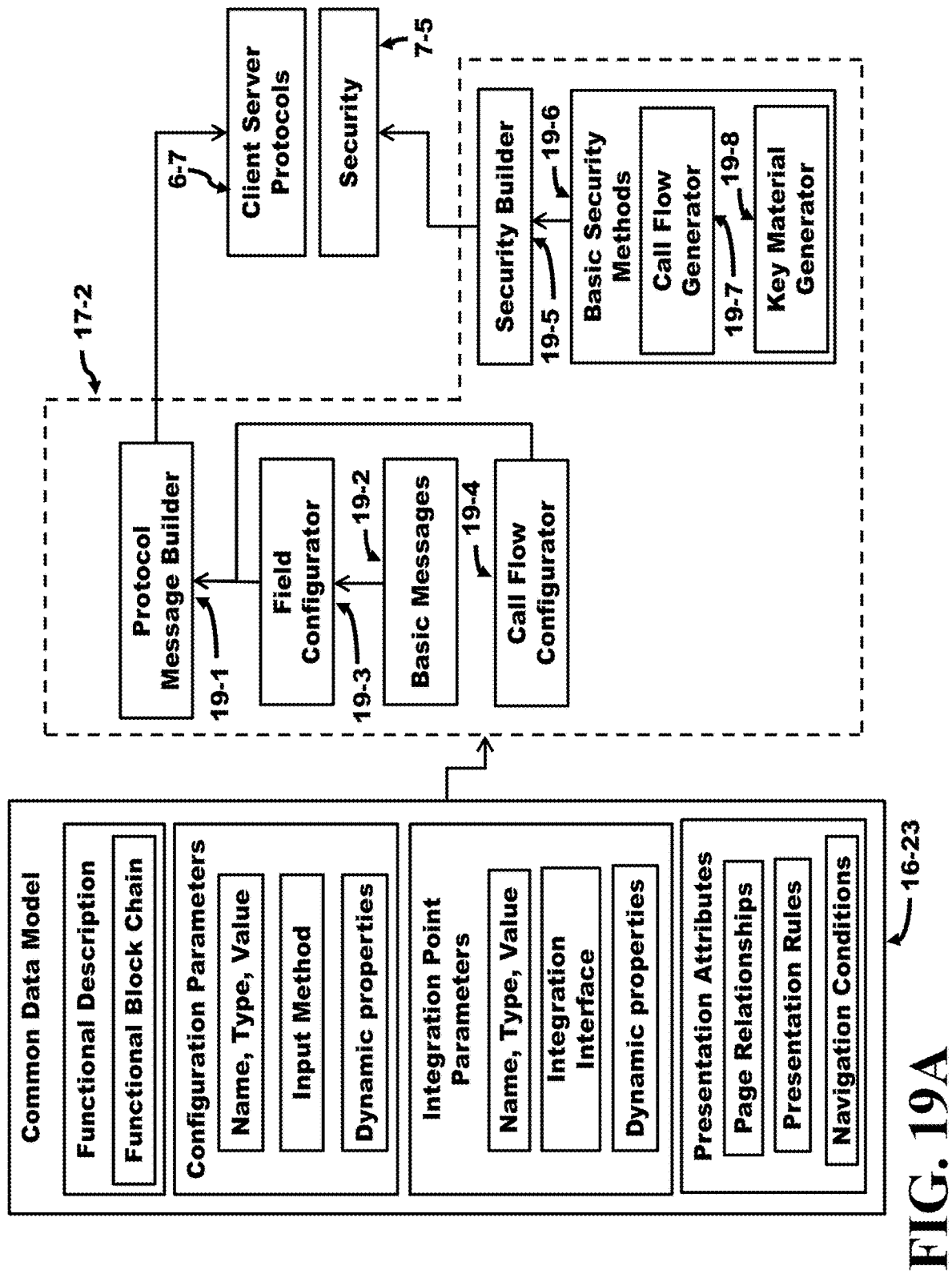
FIG. 19A shows an Automatic Protocol Generator in accordance with the present invention.

FIG. 19A illustrates the Common Data Model 16-23 which applies its output to the Automatic Protocol Generator 17-2. The Automatic Protocol Generator 17-2 has two flows. The first one is from the Basic Messages 19-2 that feeds its output to the Field Configurator 19-3, which in turn feeds it output to the Protocol Message Builder 19-1. The Call Flow Configurator 19-4 also feeds its output to the Protocol Message Builder 19-1. The output of the Protocol Message Builder 19-1 determines the Client/Server Protocol 6-7. The second flow is from the Basic Security Methods 19-6 that applies its output to the Security Builder 19-5. The output of the Security Builder 19-5 generates the Security 7-5. The Basic Security Methods 19-6 consist of the Call Flow Generator 19-7 and the Key Material Generator 19-8. This Automatic Protocol Generator 17-2 generates the protocol for the client/server as well as ensuring security.

Figure 19B:
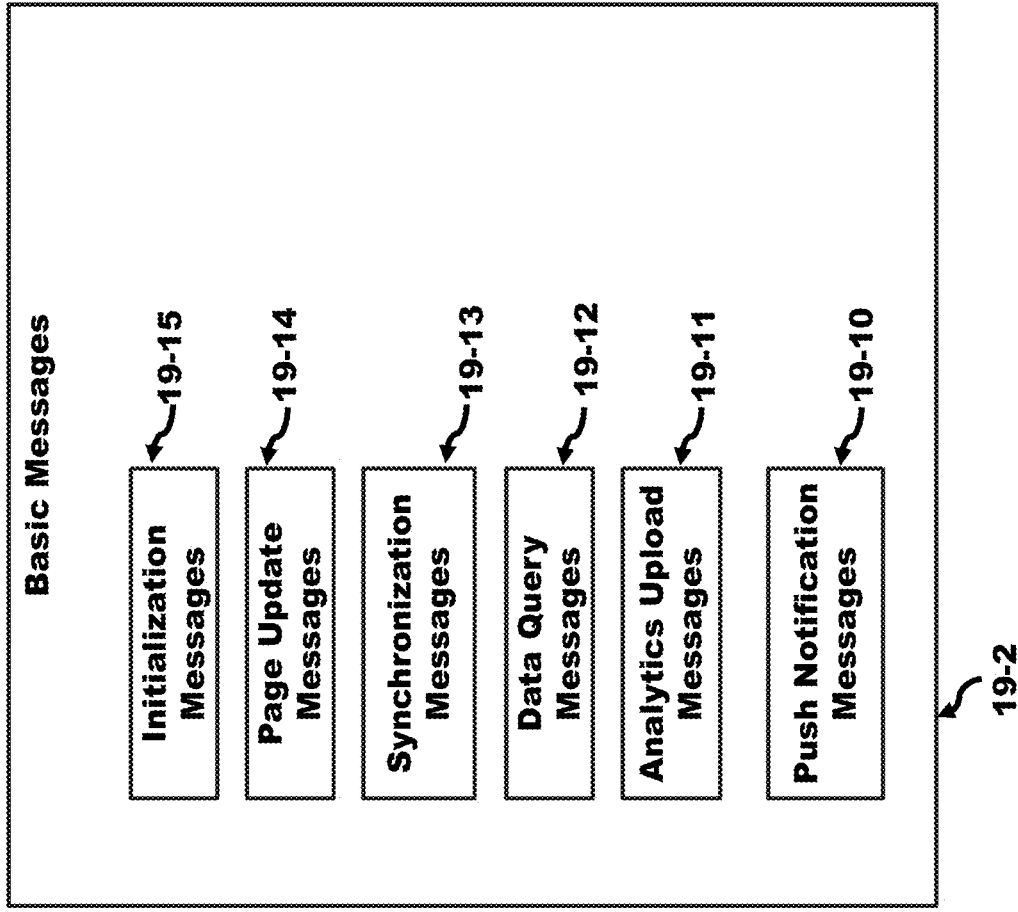
FIG. 19B depicts the Basic Messages of FIG. 19A in accordance with the present invention.

In FIG. 19B shows examples of the Basic Message 19-2 and the components the Basic Message contains. There is Push Notification Messages 19-10, an Analytics Upload Message 19-11 Data Query Messages 19-12, Synchronization Messages 19-13, Page Update Messages 19-14 and Initialization Messages 19-15.

Figure 20A:
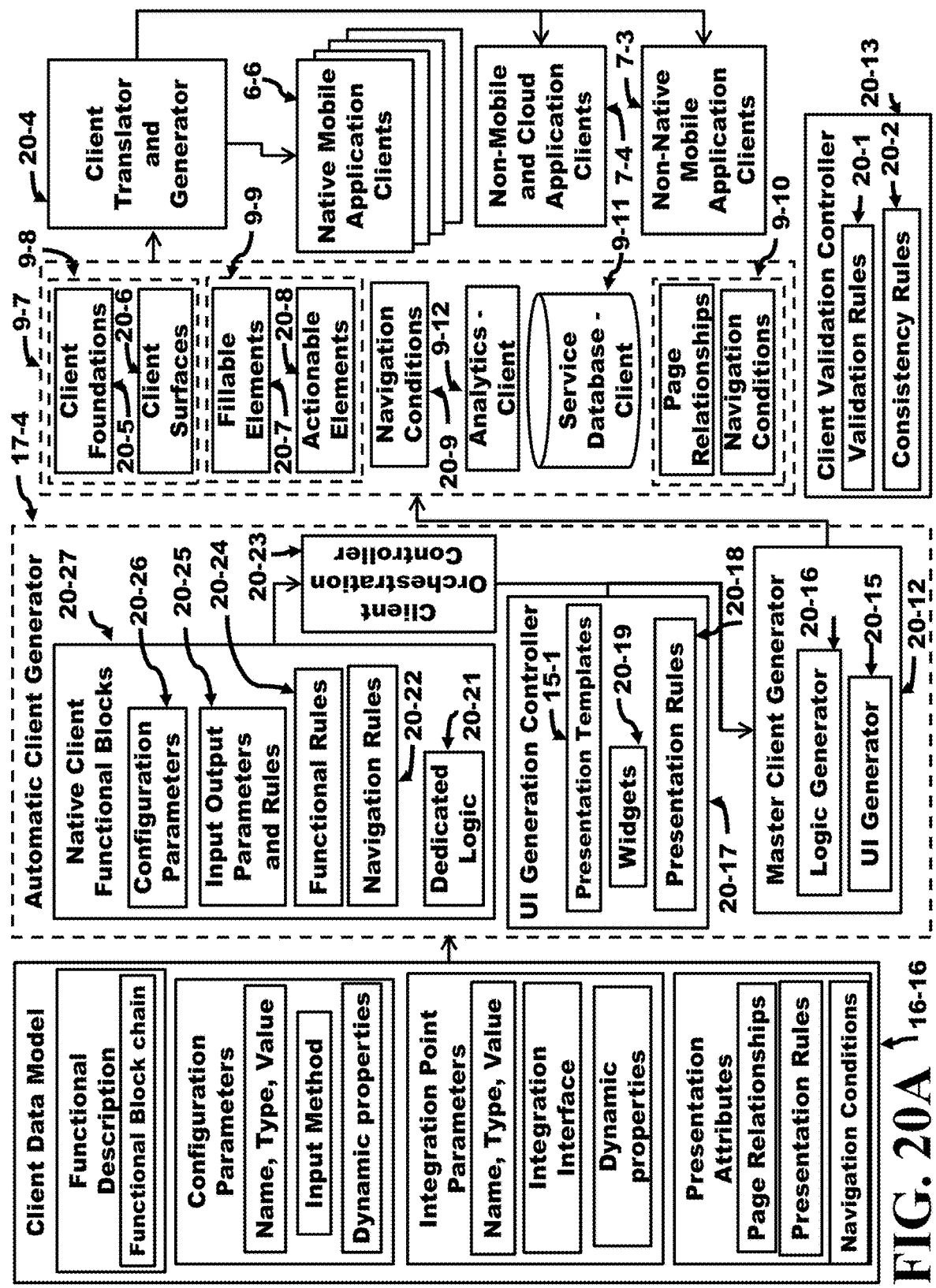
FIG. 20A shows an Automatic Client Generator in accordance with the present invention.

FIG. 20A illustrates the internal components of the Automatic Client Generator 17-4. The Automatic Client Generator 17-4 uses the Client Data Model 16-16 to generate the Application Client 9-7 which is used to create the Native Client Translation and Generator 20-4. The Native Client Translation and Generator 20-4 create the Native Mobile Client 6-6, the Non-Mobile and Cloud Application Clients 7-4 and the Non-Native Mobile Application Clients 7-3. In the process of doing this there is a Client Validation Controller 20-13 that contains Validation Rules 20-1 and Consistency Rules 20-2 to ensure that the client components are generated appropriately. Inside the Automatic Client Generator 17-4 is the Native Client Functional Blocks 20-27 that feeds to a Client Orchestration Controller 20-23 which creates the UI Generator Controller 20-17 and the Master Client Generator 20-12. Inside the Native Client Functional Blocks 20-27 are the Configuration Parameters 20-26, Input Output Parameters and Rules 20-25, the Functional Rules 20-24, the Navigation Rules 20-22 and a Dedicated Logic 20-21. Inside of the UI Generator Controller 20-17 are the Presentation Template 15-1 as described in FIG. 15J, the Widgets 20-19 and the Presentation Rules 20-18. The Master Client Generator 20-12 contains the Logic Generator 20-16 and the UI Generator 20-15. The Application Client 9-7 contains the Client Foundation 20-5, the Client Surfaces 20-6, the Fillable Elements 20-7, the Actionable Elements 20-8, the Navigation Conditions 20-9, the Analytics-Client 9-12, Service Database-Client 9-11, Page Relationships and Navigation Conditions. The Client Foundation 20-5 and the Client Surfaces 20-6 are in the Application Client User Interface 9-8. The Fillable Elements 20-7 and the Actionable Elements 20-8 are in the Application Client Service Logic 9-9. The Application Client 9-7 also comprises the Navigation Conditions 20-9, the Analytics-Client 9-12, and the Service Database-Client 9-11. The Page Relationships and Navigation Conditions are in Application Flow 9-10. These blocks contain all the functionality that is implemented in the Application Clients. The Application Client 9-7 contains the functionality that is implemented in the Master Client (i.e., one of the Application Clients selected as a reference Application Client). This functionality is then processed by the Native Client Translation and Generator 20-4 to generate the set of Native Mobile Application Clients 6-6, Non-Mobile and Cloud Application Clients 7-4, and Non-Native Mobile Application Clients 7-3.

Note that the Blocks inside the Native Client Functional Blocks 20-27 of FIG. 20A are the same as the contents as the Blocks inside of the Server Functional Blocks 18-8 of FIG. 18A. These two blocks involving the native Client and the Server are used to generate new functionality of Services 10-3 from a list of Basic Functional Blocks.

Figure 20B:
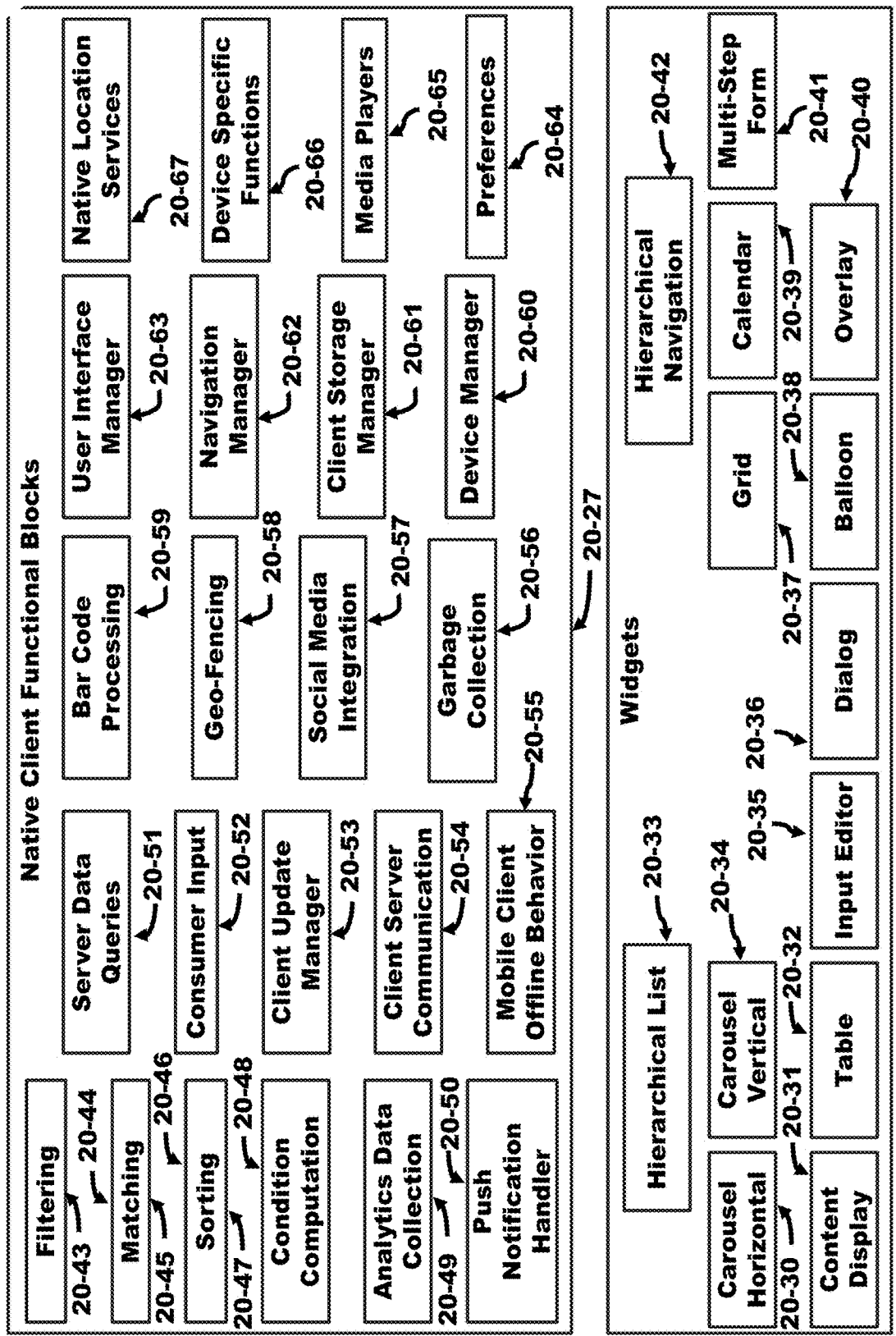
FIG. 20B illustrates the Native Client Functional Blocks and Widgets to build the User Interface of FIG. 20A in accordance with the present invention.

In FIG. 20A, the Automatic Client Generator 17-4 comprises the Native Client Functional Blocks 20-27 and the Widgets 20-19. In FIG. 20B, the Native Client Functional Block 20-27 contains blocks 20-43 through 20-67 which are involved with matching, filtering, client-server communications, managing and locations. These blocks include filtering 20-43, matching 20-45, sorting 20-47, Condition Computation 20-48, Analytics Data Collection 20-49, Push Notification Handler 20-50, Server Data Queries 20-51, Consumer Input 20-52, Client Update Manager 20-53, Client Server Communication 20-54, Mobile Client Offline Behavior 20-55, Garbage Collection 20-56, Social Media Integration 20-57, Geo-Fencing 20-59, Bar Code Processing 20-59, Device Manager 20-60, Client Storage Manager 20-61, Navigation Manager 20-62, User Interface Manager 20-63, Preferences 20-64, Media Players 20-65, Device Specific Functions 20-66 and Native Location Services 20-67. In FIG. 20B, the Widgets 20-19 are also indicated and provide tables, overlays, navigation, grids and calendars. These comprise the blocks 20-30 through 20-42. These blocks are the Carousel Horizontal 20-30, Content Display 20-31, Table 20-32, Hierarchical List 20-33, Carousel Vertical 20-34, Input Editor 20-35, Dialog 20-36, Grid 20-37, Balloon 20-38, Calendar 20-39, Overlay 20-40, Multi-Step Form 20-41 and Hierarchical Navigation 20-42.

Figure 21:
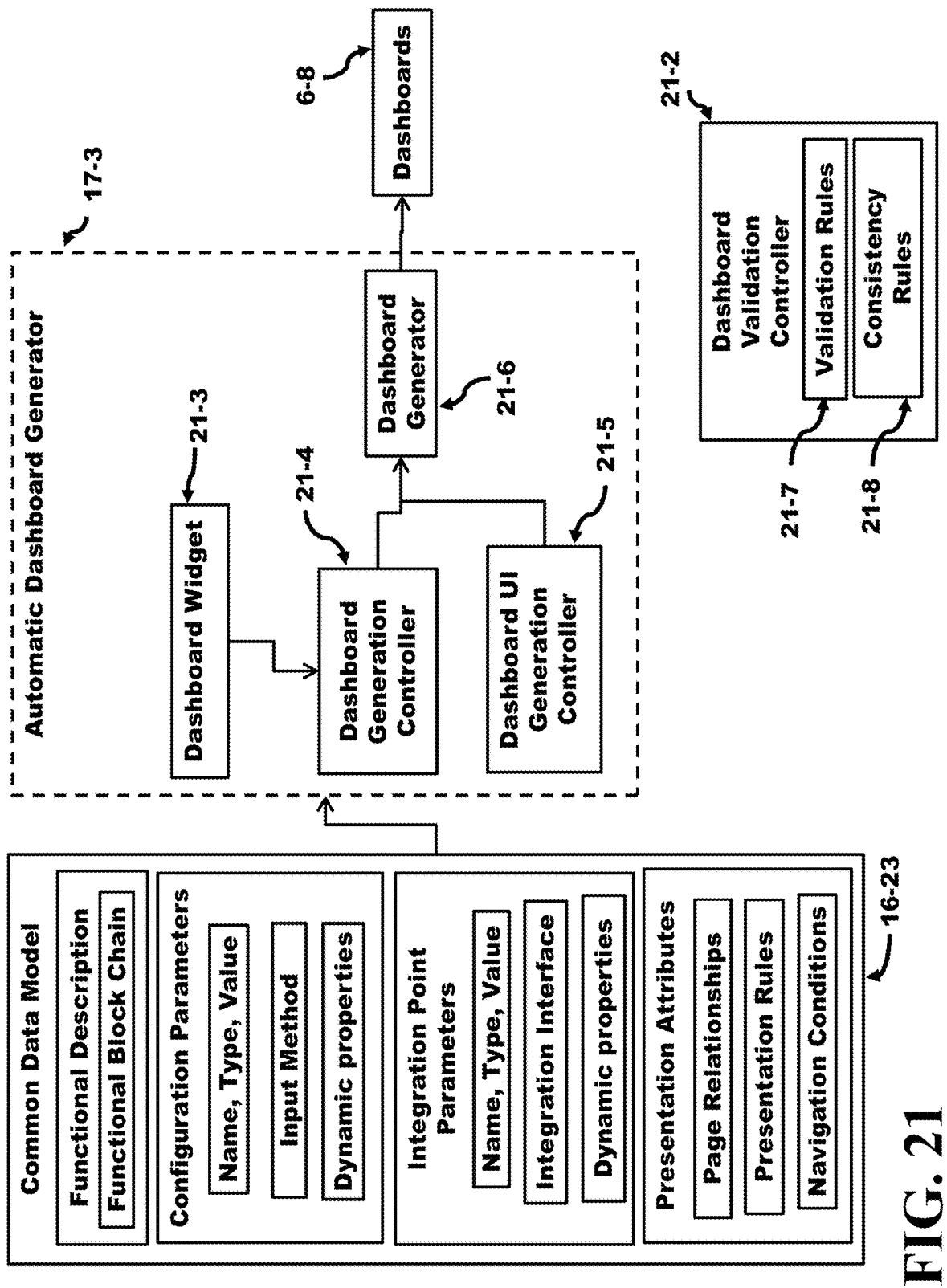
FIG. 21 depicts an Automatic Dashboard Generator in accordance with the present invention.

FIG. 21 illustrates the Automatic Dashboard Generator 17-3 which uses the Common Data Model 16-23 to generate the Dashboards 6-8. The Automatic Dashboard Generator 17-3 contains a Dashboard Widget 21-3 which feeds into a Dashboard Generator Controller 21-4. The output of the Dashboard Generator Controller 21-4 and the output of the Dashboard UI Generator Controller 21-5 are applied to the Dashboard Generator 21-6. The output of the Dashboard Generator 21-6 generates the Dashboards 6-8. At all times, the Dashboard Validation Controller 21-2 uses the Validation Rules 21-7 and Consistency Rules 21-8 to ensure that the Dashboards 6-8 are generated correctly.

Figure 22A:
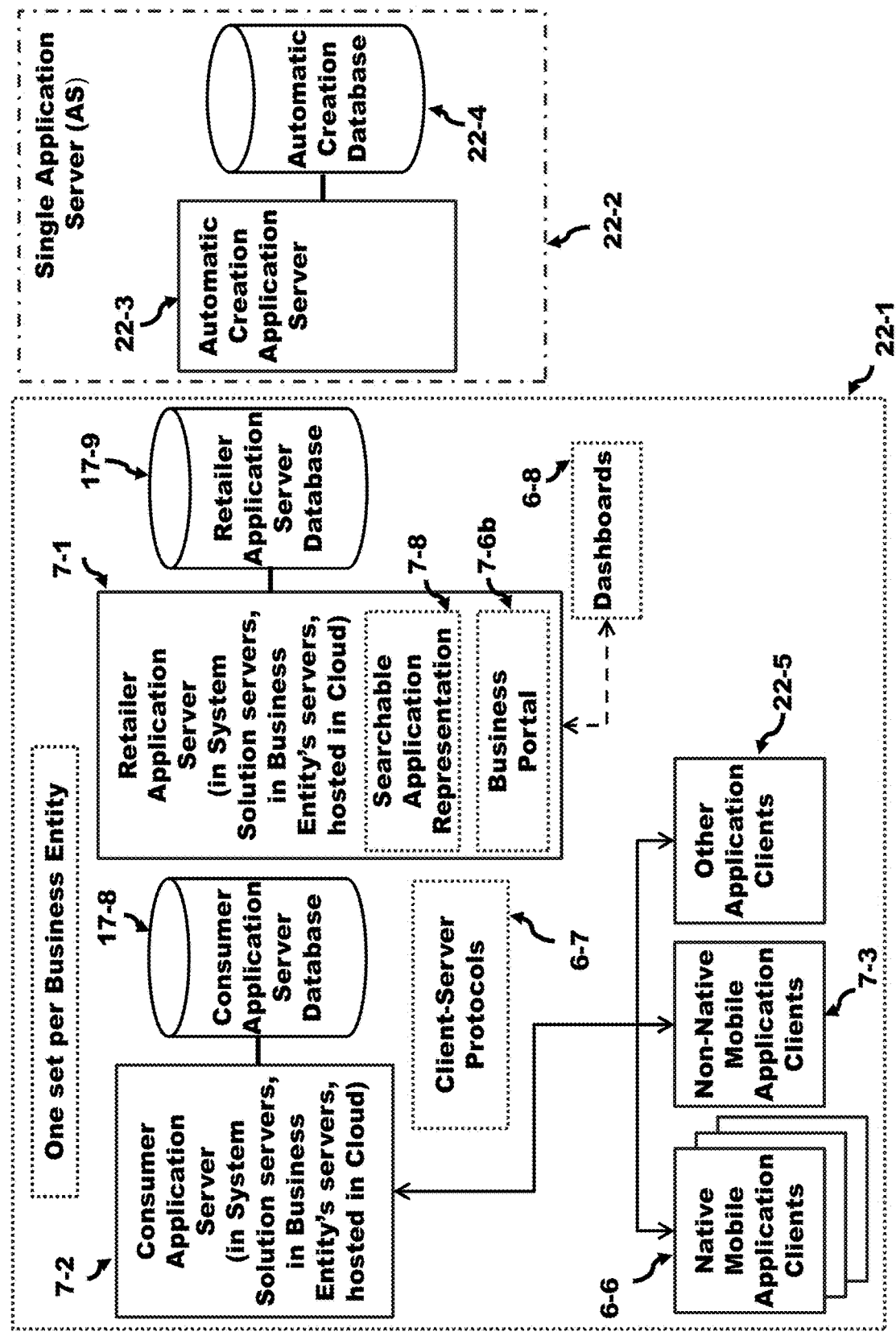
FIG. 22A shows Single Application Server for the System Solution in accordance with the present invention.

FIG. 22A illustrates the apparatus of the Single System Solution Application Server or Single Application Server 22-2. The Single Application Server contains the Automatic Creation Application Server 22-3 with a corresponding Single System Solution Automatic Creation Database or Single Automatic Creation Database 22-4. There is only one of these single application servers in the System Solution apparatus. However, each of the Business Entities coupled to the System Solution comprises the components within the dotted box 22-1. There is a Consumer Application Server 7-2 and a corresponding Consumer Application Server Database 17-8 and a Retailer Application Server 7-1 with its corresponding Retailer Application Server Database 17-9. A Client-Server Protocol 6-7 communicates in between the servers and the Native Mobile Application Clients 6-6, the Non-Native Mobile Application Clients 7-3 and Other Application Clients 22-5. The Retailer Application Server 7-1 contains a Searchable Application Representation 7-8 and a Business Portal 7-6b. The Retailer Application Server 7-1 is connected to the Dashboards 6-8.

Figure 2A:
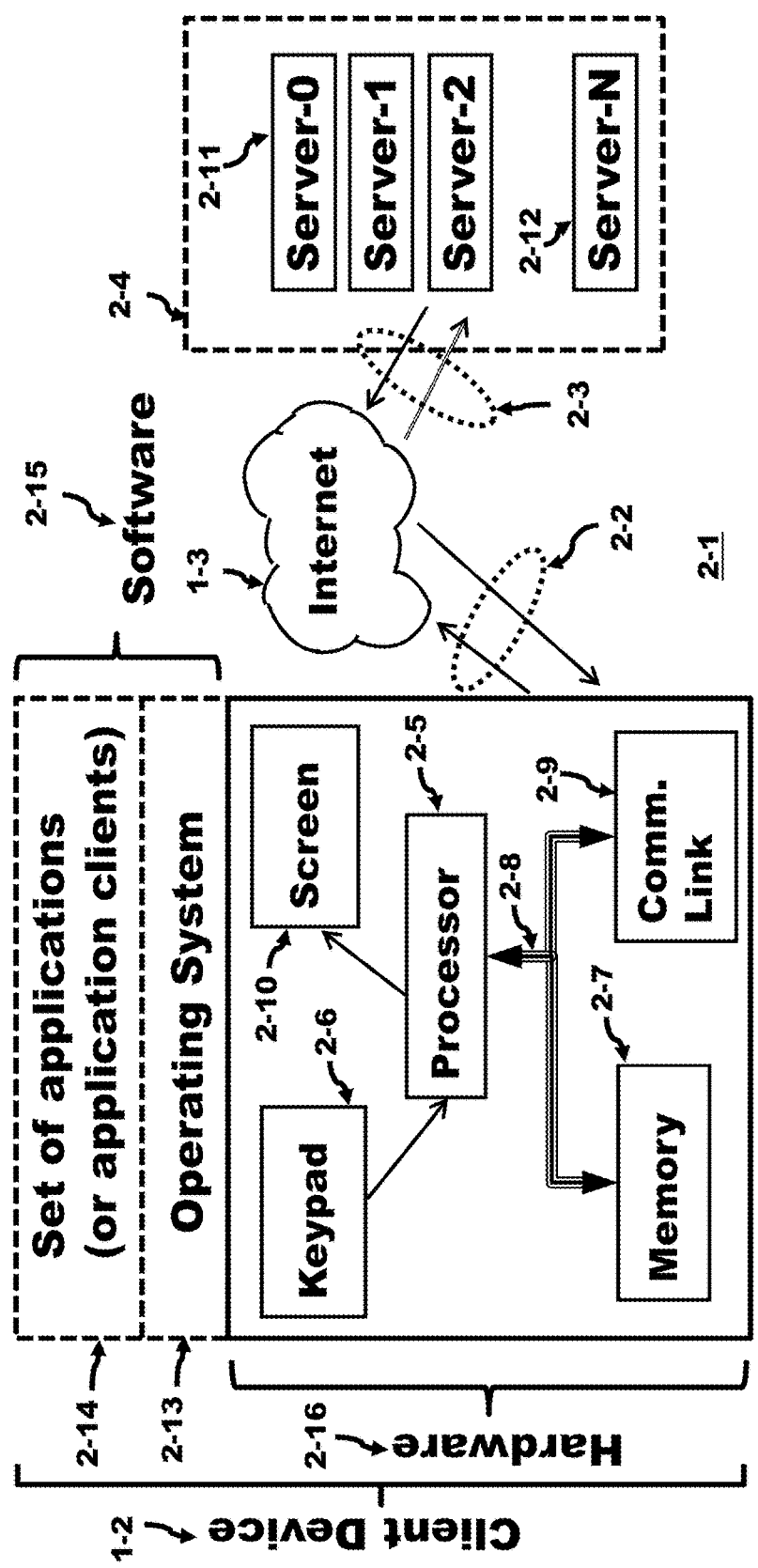
FIG. 2A shows a Client Device with a coupling to a bank of servers and the internal hardware/software structure of the Client Device.
Figure 2B:
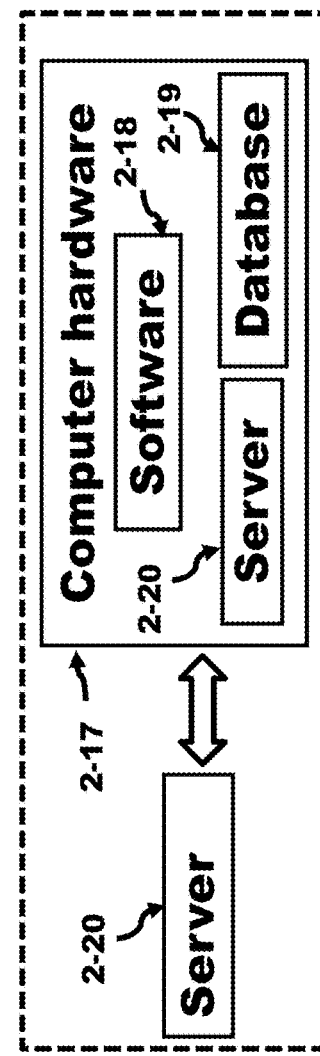
FIG. 2B depicts a more detailed description of a server being a subset of Computer hardware with software, a Database and the server.
Figure 3:
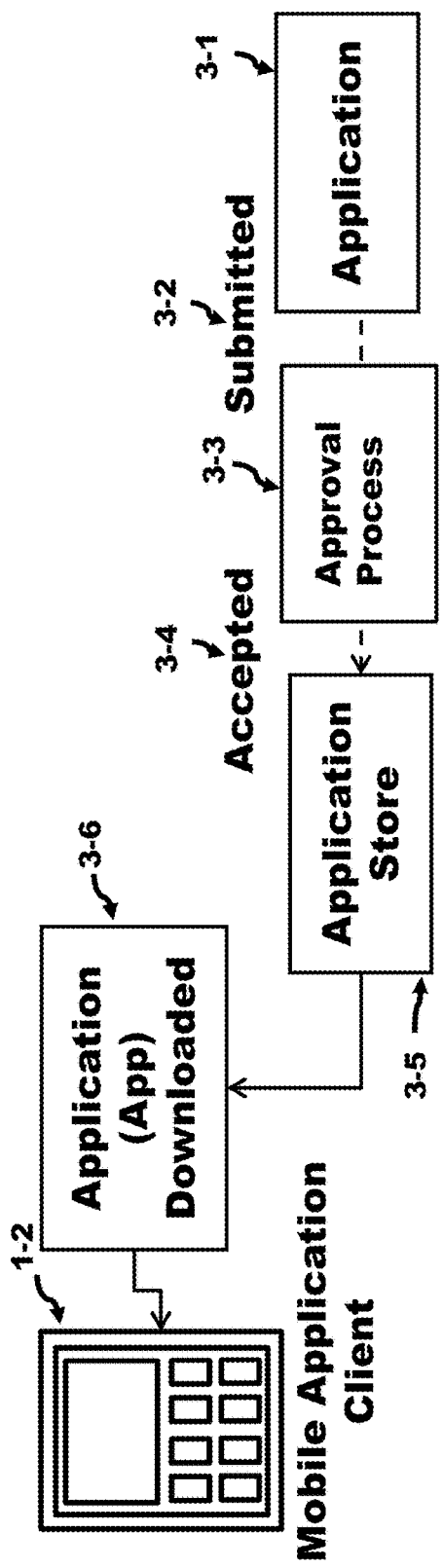
FIG. 3 presents the current approval process of an application store.
Figure 4:
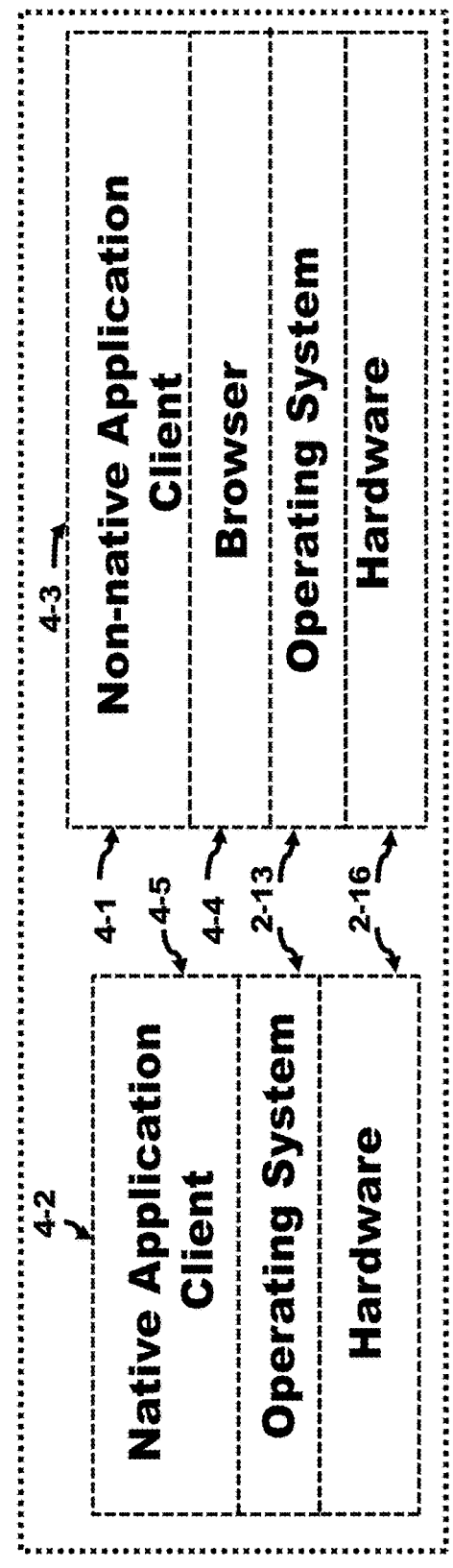
FIG. 4 illustrates two different stacks of a native application and a non-native application in HTML5 running on a web browser.
Figure 22B:
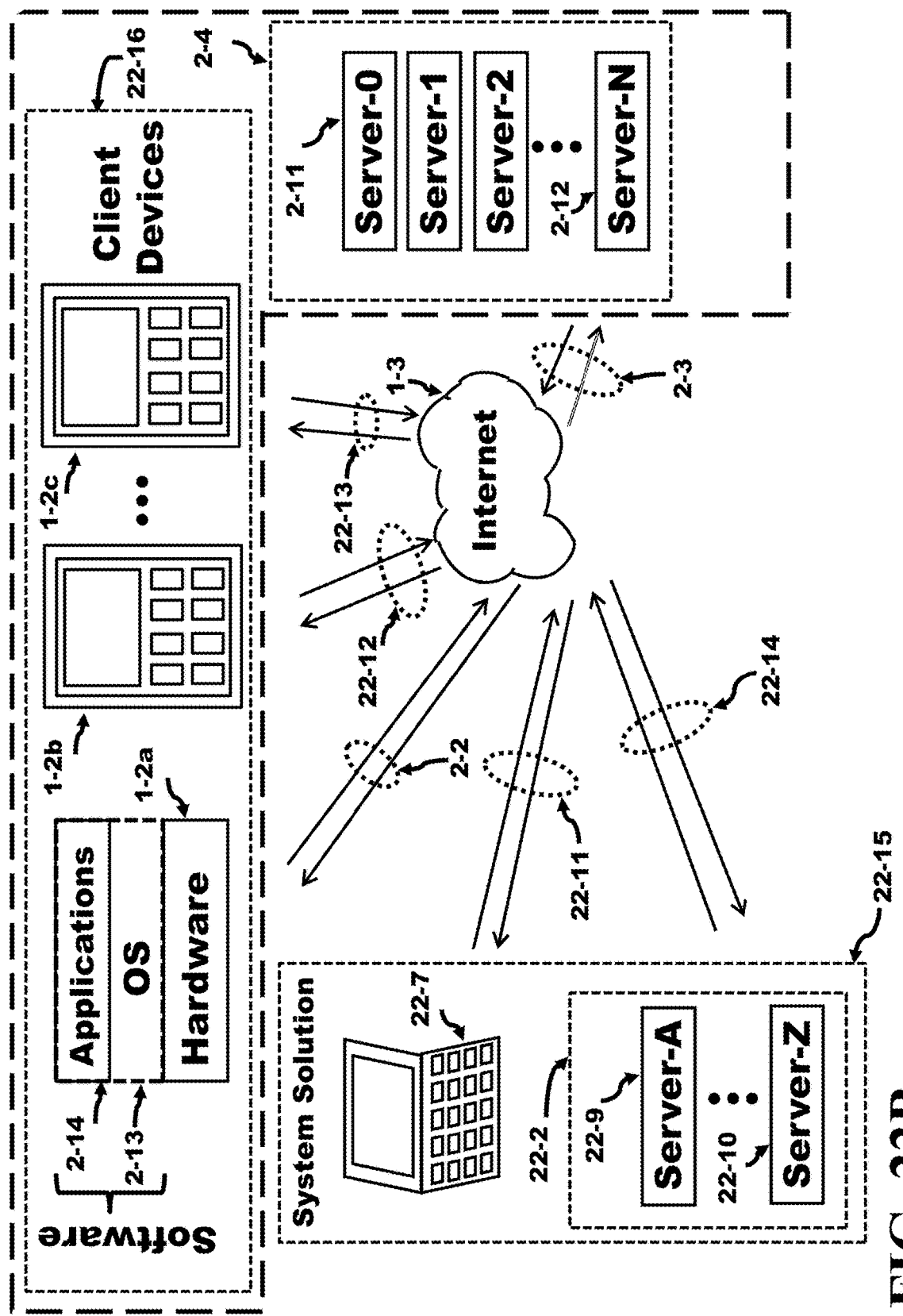
FIG. 22B illustrates an apparatus showing the interconnectivity between the servers, Client devices and the System Solution in accordance with the present invention.

FIG. 22B illustrates a System Solution 22-15 coupled to a Business Entity 5-1. At least one of System Solution Computing devices 22-7 and at least one System Solution servers 22-2 that comprises Server-A 22-9 through Server-Z 22-10 is coupled to the Business Entity 5-1 though the Internet 1-3. The Automatic Creation Application Server 22-3 with a corresponding Automatic Creation Database 22-4 is a sub-set of the server bank 22-2. It is understood that the Applications 2-14 running on the OS 2-13 of the Client Devices 1-2a, 1-2c, and 1-2c in Client Devices 22-16 are generated by the block 22-2 under the control of the System Solution 22-15. The System Solution servers 22-2 can also be located in the Cloud, in the vicinity of the Computing devices 22-7 or a combination of any therein. The System Solution 22-15 couples to the Internet via all interconnects 22-11, 22-14, 2-3, 22-13, 22-12 and 2-2. This interconnection can be a wireline or wireless and is part of the Communication network. The System Solution 22-15 creates through the Internet 1-3 Application servers, appropriate Server/client protocols, Databases Server for the Business Entities, Dashboards, security insurances, etc., with the server bank 2-4 that comprises Server-0 2-11 through server-N 2-12 via interconnect 2-3. The generated Applications for Native or Non-Native Clients are applied to Client Devices 1-2*a* via interconnect 2-2, Client Device 1-2*b* via interconnect 22-12 and Client Device 1-2*c* via interconnect 22-13. These Client Devices can be mobile, non-mobile or in the Cloud and have a software and hardware similar to that explained in FIG. 2A. For the latter, some of the application is split between the Cloud and the Client Device. At all times, the System Solution 22-15 is monitoring the interactions between the Clients Devices and the Application servers, appropriate Server/client protocols, Databases Server for the Business Entities, Dashboards, security insurances, etc. via the interconnects to and between the Internet 1-3.

The automatically generated Applications and updated Applications are both generated in FIG. 22B. The generated Applications apply to Native as well as non-Native devices. All desired Services 10-3 are also included in the automatically generated Applications. The updated Applications may be generated by the Business Entity through the use of the Dashboard 6-8 provided by the System Solution 22-15 allowing the Business Entity 5-1 to change a portion of the application or for the Dashboard 6-8 under the control of the System Solution 22-15 to alter the entire "look." For the updated Applications there may be no need to re-apply to the Application store 3-5 for approval.

Finally, it is understood that the above descriptions are only illustrative of the principle of the current invention. Various alterations, improvements, and modifications will occur and are intended to be suggested hereby, and are within the spirit and scope of the invention. This invention can, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. In accordance with these principles, those skilled in the art can devise numerous modifications without departing from the spirit and scope of the invention. For example, In addition, a network and a portable system can exchange information wirelessly by using communication techniques such as Time Division Multiple Access (TDMA), Frequency Division Multiple Access (FDMA), Code Division Multiple Access (CDMA), Orthogonal Frequency Division Multiplexing (OFDM), Ultra Wide Band (UWB), Wi-Fi, WiGig, Bluetooth, etc. The network can comprise the phone network, IP (Internet protocol) network, Local Area Network (LAN), ad hoc networks, local routers and even other portable systems. In addition, the term "Mobile Client Device" can be used for mobile devices such as cellphone, tablets, etc. "Non-Mobile Client Device" can be used for non-mobile devices such as desktops. "Cloud Client Device" can be used for the device formed in the Cloud. At other instants the term "Client Device" can imply either the "Mobile Client Device," "Non-Mobile Client Device" or "Cloud Client Device."

What is claimed is:

1. A system comprising:
    a server connected to a network;
    an automatic data model generator connected to the network and configured to receive a service representation and entity-specific data and, responsive to a receiving, automatically generate a data model based on the service representation and the entity-specific data; and
    an automatic application generator configured to automatically generate a plurality of application components based on the data model and the plurality of application components comprises an application client of which a portion of the application client is configured to run on a mobile device and a remaining portion of the application client is configured to run on the server, an application server, a client-server protocol, and a dashboard generator configured to generate a dashboard, the application generator configured to generate an input to the dashboard generator to generate the dashboard, which is used to update the data model; and
    the automatic application generator configured to being coupled, via the network, to the server, the automatic application generator configured to deploy and install the application server software to the server.

2. The system of claim 1, wherein a plurality of validation controllers show a validity and a consistency of each of the application components.

3. The system of claim 1, wherein the first subset of the application components further comprises a retailer application server and a retailer application server database, a consumer application server, and a consumer application server database created by an automatic application server generator coupled to a server data model.

4. The system of claim 1, wherein the first subset of the application components further comprises a security module, the client-server protocol and security module being created by an automatic protocol generator coupled to a common data model.

5. The system of claim 1, wherein a generating a plurality of application components further comprises generating a set of native mobile application clients, a non-native mobile application client, a non-mobile application client and a cloud application client.

6. The system of claim 1, wherein the second subset of the application components further comprises an analytics module, a native application client, a non-native application client, a desktop application client, and a cloud application client created by an automatic client generator coupled to a client data model.

7. The system of claim 1, wherein the first subset of the application components further comprises a searchable application representation created by an automatic searchable application representation generator coupled to a common data model.

8. The system of claim 1, wherein the data model comprises a common data model, a server data model and a client data model, and outputs of the data model are partitioned between a common data model output, a server data model output and a client data model output.

9. The system of claim 8, wherein the data model further comprises a functional description, configuration parameters, integration point parameters and presentation attributes.

10. The system of claim 1, wherein the mobile device is a wearable device coupled to a communication network.

11. The system of claim 1, further comprising:
    a first client device with a first operating system that is downloaded with at least one native mobile application; and a second client device with a second operating system that is downloaded with at least one non-native mobile application.

12. A system comprising:

a server connected to a network;

an automatic data model generator connected to the network and configured to receive a service representation and entity-specific data and, responsive to receiving the service representation, automatically generate a data model based on the service representation and the entity-specific data; and an automatic application generator configured to automatically generate a plurality of application components based on the data model and the plurality of application components comprises an application client of which a portion of the application client is configured to run on a mobile device and a remaining portion of the application client is configured to run on the server, an application server, a client-server protocol, and a dashboard generator configured to generate a dashboard, the application generator configured to generate an input to the dashboard generator to generate the dashboard, which is used to update the data model; and the automatic application generator configured to being coupled, via the network, to the server, wherein the automatic application generator is configured to deploy and install the application server software to the server.

13. The system of claim 12, further comprising:

a plurality of validation controllers to show a validity and a consistency of the data model.

14. The system of claim 12, wherein the service representation comprises a high-level feature list including a service black box description, a service flavor, a service feature, a service configuration, a service user interface, a dashboard, a service integration point, a service internal interface, a service presentation and a service status.

15. The system of claim 12, wherein the data model comprises a common data model, a server data model and a client data model, and outputs of the data model are partitioned between a common data model output, a server data model output and a client data model output.

16. The system of claim 15, wherein the data model comprises a functional description, a configuration parameter, an integration point parameter, and a presentation attribute.

17. A system comprising:

a processor;

a memory coupled to the processor, the memory configured to have stored therein software instructions that, when executed by the processor, cause the processor to perform operations including:

automatically generating a plurality of application components based on a data model and the plurality of application components comprising an application client of which a portion of the application client is configured to run on a mobile device and a remaining portion of the application client is configured to run on the server, an application server, a client-server protocol, and a dashboard generator configured to generate a dashboard, the application generator configured to generate an input to the dashboard generator to generate the dashboard, adapted to form an integrated system providing an automatically generated multi-platform application, deploying the application server software to one or more servers, and installing the application server software on the one or more servers, the one or more servers being adapted by the installed application server software to receive user input via the dashboard;

generating, responsive to the user input via the dashboard, an updated data model; and generating an updated application client based on the updated data model, wherein the application server software is configured to update the application client.

18. The system of claim 17, wherein the operations further include:

determining validity and consistency of the updated data model; and determining validity and consistency of the updated application client.

19. The system of claim 18, wherein the updated application client includes an updated native application client, an updated non-native application client, an updated desktop application client, and an updated cloud application client.

20. The system of claim 19, wherein the operations further include:

making the updated application client available to be downloaded to a corresponding mobile device.

* * * * *